United States Patent [19]

Otsuki

[11] Patent Number: 5,311,573
[45] Date of Patent: May 10, 1994

[54] FACSIMILE APPARATUS

[75] Inventor: Shinichiro Otsuki, Yokohama, Japan

[73] Assignee: Canon Kabushiki Kaisha, Tokyo, Japan

[21] Appl. No.: 3,957

[22] Filed: Jan. 19, 1993

Related U.S. Application Data

[63] Continuation of Ser. No. 742,277, Aug. 8, 1991, abandoned, which is a continuation of Ser. No. 404,961, Sep. 8, 1989, abandoned.

[30] Foreign Application Priority Data

Sep. 9, 1988 [JP] Japan .......................... 63-226011
Sep. 28, 1988 [JP] Japan .......................... 63-245555

[51] Int. Cl.⁵ .................... H04M 1/64; H04M 11/06
[52] U.S. Cl. .......................... 379/67; 379/70; 379/88; 379/100
[58] Field of Search .................. 379/67, 88, 89, 70, 379/100

[56] References Cited

U.S. PATENT DOCUMENTS

| | | | |
|---|---|---|---|
| 4,518,989 | 5/1985 | Yabiki et al. | 379/88 X |
| 4,881,608 | 11/1989 | Otsuki | 178/18 |
| 4,916,726 | 4/1990 | Morley et al. | 379/88 |
| 4,926,463 | 5/1990 | Ukeyama | 379/88 |

FOREIGN PATENT DOCUMENTS 59-214366 12/1983 Japan .......................... 379/100

Primary Examiner—James L. Dwyer
Assistant Examiner—Paul A. Fournier
Attorney, Agent, or Firm—Fitzpatrick, Cella, Harper & Scinto

[57] ABSTRACT

A communication apparatus, which is able to receive a peculiar information of other station and a voice message from the another station, records the peculiar information and the voice message in connection with each other.

12 Claims, 43 Drawing Sheets

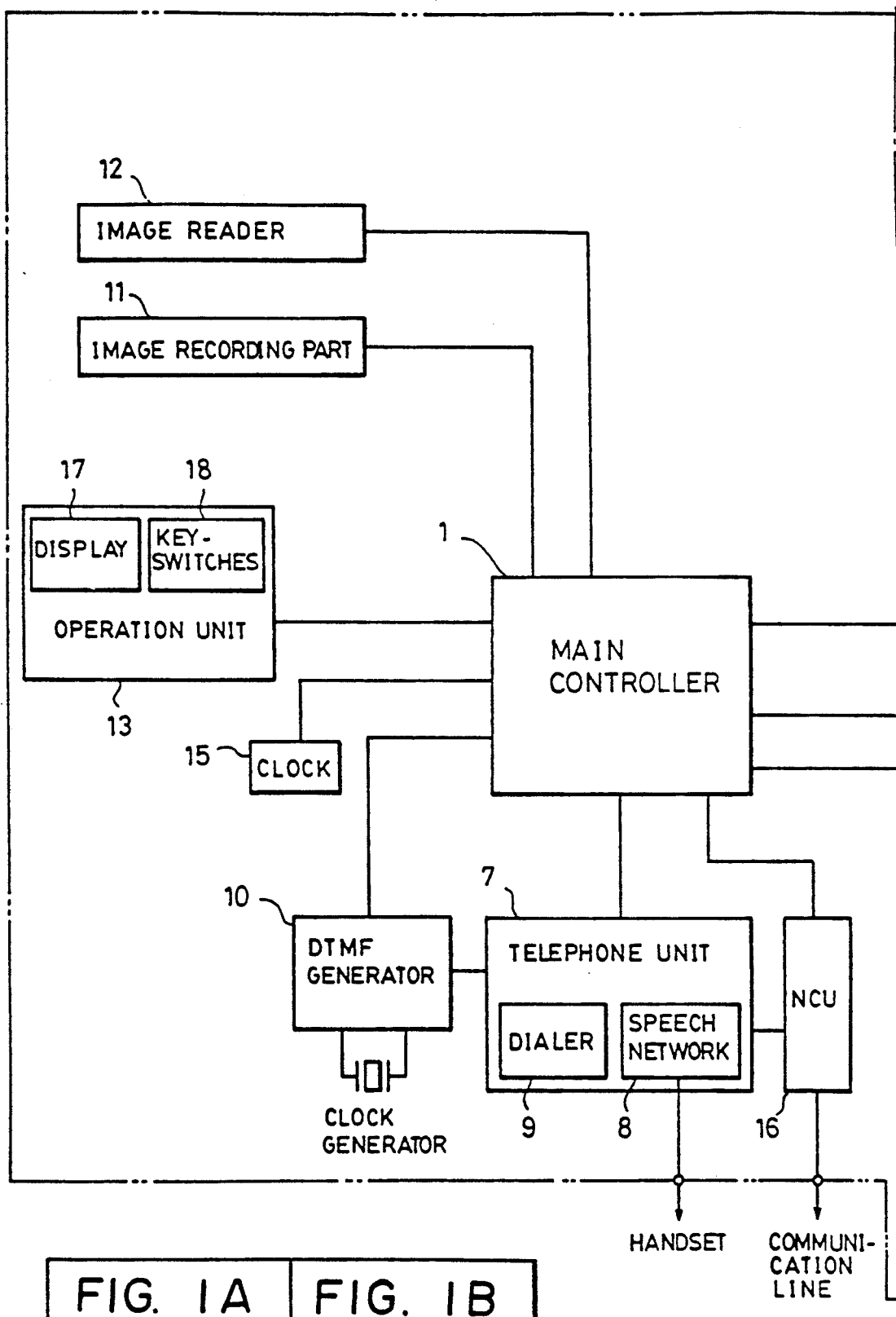

FIG. 5

| (HEX) ROW \ (HEX) COLUMN | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NUL | TC₇(DLE) | (SP) | 0 | @ | P | ` | p | | | ND | ─ | ア | ミ | | |
| 1 | TC₁(SOH) | DC₁ | ! | 1 | A | Q | a | q | | | 。 | ア | チ | ム | | |
| 2 | TC₂(STX) | DC₂ | " | 2 | B | R | b | r | | | 「 | イ | ツ | メ | | |
| 3 | TC₃(ETX) | DC₃ | # | 3 | C | S | c | s | | | 」 | ウ | テ | モ | | |
| 4 | TC₄(EOT) | DC₄ | $ | 4 | D | T | d | t | | | 、 | エ | ト | ヤ | | |
| 5 | TC₅(ENQ) | TC₈(NAK) | % | 5 | E | U | e | u | | | ・ | オ | ナ | ユ | | |
| 6 | TC₆(ACK) | TC₉(SYN) | & | 6 | F | V | f | v | | | ヲ | カ | ニ | ヨ | | |
| 7 | BEL | TC₁₀(ETB) | ' | 7 | G | W | g | w | NOT DEFINED (ND) | NOT DEFINED (ND) | ァ | キ | ヌ | ラ | ND | ND |
| 8 | FE₀(BS) | CAN | ( | 8 | H | X | h | x | | | ィ | ク | ネ | リ | | |
| 9 | FE₁(HT) | EM | ) | 9 | I | Y | i | y | | | ゥ | ケ | ノ | ル | | |
| A | FE₂(LF) | SUB | * | : | J | Z | j | z | | | ェ | コ | ハ | レ | | |
| B | FE₃(VT) | ESC | + | ; | K | [ | k | { | | | ォ | サ | ヒ | ロ | | |
| C | FE₄(FF) | IS₄(FS) | , | < | L | \ | l | \| | | | ャ | シ | フ | ワ | | |
| D | FE₅(CR) | IS₃(GS) | - | = | M | ] | m | } | | | ュ | ス | ヘ | ン | | |
| E | SO | IS₂(RS) | . | > | N | ^ | n | ‾ | | | ョ | セ | ホ | ゛ | | |
| F | SI | IS₁(US) | / | ? | O | _ | o | DEL | | | ッ | ソ | マ | ゜ | | |

AN EXAMPLE OF TEL # 03 (757) 6293

FIG. 8

AREA FOR FIXED MESSAGES (32 FIXED WORDS ×8)

| | | | | | | | | |
|---|---|---|---|---|---|---|---|---|
| #0 | C | A | L | L | ] | M | E | ] | B | A | C | K | ] | S | O | O | N | . | ] | ] | ] | ] | ] | ] | ] | ] | ] | ] | ] | ] | ] |
| #1 | C | A | L | L | ] | T | H | E | ] | O | T | H | E | R | ] | P | A | R | T | Y | ] | S | O | O | N | . | ] | ] | ] | ] | ] |
| #2 | R | E | S | P | O | N | S | E | ] | M | E | ] | B | Y | ] | R | E | T | U | R | N | ] | F | A | C | S | I | M | I | L | E | . |
| #3 | S | E | E | ] | T | H | E | ] | F | A | X | ] | L | E | T | T | E | R | ] | I | ] | S | E | N | T | . | ] | ] | ] | ] | ] |
| #4 | C | A | L | L | ] | M | E | ] | U | P | ] | B | Y | ] | T | H | E | ] | P | A | G | I | N | G | ] | M | A | C | H | I | N | E |
| #5 | | | | | | | | | | | | | | | | | | | | | | | | | | | | | | | | |
| #6 | | | | | | | | | | | | | | | | | | | | | | | | | | | | | | | | |
| #7 | | | | | | | | | | | | | | | | | | | | | | | | | | | | | | | | |

THESE AREAS CAN BE DEFINED BY OPERATORS.

] MEANS SPACE

FIG. 9

NAMES OF OPERATORS (16 FIXED WORDS ×8)

| | | | | | | | | | | | | | | | | |
|---|---|---|---|---|---|---|---|---|---|---|---|---|---|---|---|---|
|#0| G | E | N | E | R | AL | ␣ | M | G | R | ␣ | T | S | U | D | A |
|#1| 1 | S | T | ␣ | D | I | V | ␣ | K | A | W | A | M | U | R | A |
|#2| 5 | T | H | ␣ | D | I | V | . | ␣ | ␣ | ␣ | I | J | U | I | N |
|#3| P | L | A | N | ␣ | D | I | V | ␣ | M | U | R | A | Y | A | M | A |
|#4| 5 | T | H | ␣ | D | I | V | ␣ | ␣ | O | H | T | S | U | K | I |
|#5| | | | | | | | | | | | | | | | |
|#6| | | | | | | | | | | | | | | | |
|#7| | | | | | | | | | | | | | | | |

5, #6, #7 } NOT DEFINED

FIG. 10

| DIAL KEY | MULTI-FREQUENCY | DIAL KEY | MULTI-FREQUENCY |
|---|---|---|---|
| 1 | 697Hz 1.209Hz | 7 | 852Hz 1.209Hz |
| 2 | 697Hz 1.336Hz | 8 | 852Hz 1.336Hz |
| 3 | 697Hz 1.477Hz | 9 | 852Hz 1.477Hz |
| 4 | 770Hz 1.209Hz | 0 | 941Hz 1.336Hz |
| 5 | 770Hz 1.336Hz | * | 941Hz 1.209Hz |
| 6 | 770Hz 1.477Hz | # | 941Hz 1.477Hz |

FIG. 11

| UPPER ADDRESS (HEXA) \ LOWER ADDRESS (HEXA) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | TN | STX | ] | ] | ] | ] | ] | ] | ] | ] | ] | ] | ] | ] | ] | ] |
| 1 | ] | ] | 3 | 9 | 2 | 6 | ] | 7 | 5 | 7 | ] | 3 | 0 | ] | ] | ] |
| 2 | A | X | ] | D | E | ] | EXT ID | STX | ] | C | A | N | O | N | ] | F |
| 3 | D | I | V | ] | ] | V | . | ] | ] | EXT | EXT NM | STX | 5 | T | H | ] |
| 4 | A | L | M | ] | O | H | T | S | U | K | I | ] | EXT MS | STX | O | C |
| 5 | . | ] | ] | ] | ] | E | ] | B | A | C | K | ] | S | O | O | N |
| 6 | | | | | | | | | | | | | | | | ETX |

] IS A SPACE

FIG. 12

| Upper Address (HEXA) | Lower Address (HEXA) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | TN | STX | 3 | 9 | 2 | 6 | ] | 7 | 5 | 7 | ] | 3 | 0 | ETX | ID | STX |
| 1 | C | A | N | O | N | ] | F | A | X | ] | D | E | V | . | ETX | NM |
| 2 | STX | 5 | T | H | ] | D | I | V | ] | ] | O | H | T | S | U | K |
| 3 | I | ETX | MS | STX | C | A | L | L | ] | M | E | ] | B | A | C | K |
| 4 | ] | S | O | O | N | . | ETX | | | | | | | | | |
| 5 | | | | | | | | | | | | | | | | |
| 6 | | | | | | | | | | | | | | | | |

] IS A SPACE

FIG. 13A

| 1st Figure \ 2nd Figure | 0 | 1 | 2 | 3 | 4 |
|---|---|---|---|---|---|
| 0 | | | IF THE 1ST AND 2ND FIGURES SHOW "00" THOUGH "25", THEY MUST HAVE A THIRD FIGURE. EACH OF "000" THROUGH "255" CORRESPONDS TO A CHARACTER OF JIS 8 UNIT CODE WHICH IS EXPRESSED BY THE DECIMAL SYSTEM | | |
| 1 | | | | | |
| 2 | | | | | |
| 3 | S | T | O | P | |
| 4 | CONTROL SIGNALS FOR COMMUNICATION OF DIGITAL DATA | | | | |
| 5 | CONTROL SIGNALS FOR FACSIMILE COMMUNICATION | | | | |

Row 5 sub-columns:

| TN | ID | NM | MS | TX |
|---|---|---|---|---|
| SET THE PRESET TIME TRANSMISSION MODE | RESET THE PRESET TIME TRANSMISSION MODE | SET THE PRESET TIME RECEPTION MODE | RESET THE PRESET TIME RECEPTION MODE | SET THE PRESET TIME POLLING MODE |

FIG. 13B

| 5 | 6 | 7 | 8 | 9 | * | # |
|---|---|---|---|---|---|---|
| RE-TN | RE-ID | RE-NM | RE-MS | RE-TX | | |
| RESET THE PRESET TIME POLLING MODE | SET THE PRESET TIME BROADCAST-ING MODE | RESET THE PRESET TIME BROADCAST-ING MODE | | | | |

FIG. 13C

| | CONTROL SIGNALS FOR FACSIMILE FUNCTIONS | | | | | |
|---|---|---|---|---|---|---|
| 6 | SET THE TRANSFERRING MODE | RESET THE TRANSFERRING MODE | CHANGE THE DESTINATION IN THE TRANSFERRING MODE | SET THE PAGING MODE | | RESET THE PAGING MODE |
| | CONTROL SIGNALS FOR THE ANSWERING TELEPHONE | | | | | |
| 7 | REPRODUSE RESPONSIVE MESSAGE | RECORD RESPONSIVE MESSAGE | CHANGE RESPONSIVE MESSAGE | | PEKETE RESPONSIVE MESSAGE | SET THE ANSWERING MODE |
| | CONTROL SIGNALS FOR THE ANSWERING TELEPHONE | | | | | |
| 8 | SET THE SECRET ID CODE | CHANGE THE SECRET ID CODE | RELEASE THE SECRET ID CODE | | SET THE ID BELL MODE | RESET THE ID BELL MODE |
| | CONTROL SIGNALS FOR THE VOICE RECODER | | | | | |
| 9 | STOP | PLAY BACK | REWIND | | SKIP SEARCH REWIND | FAST FEEDING |
| * | | | | | | |
| # | AFFIRMATION INPUT | | | | | |

FIG. 13

| FIG. 13A | FIG. 13B |
|---|---|
| FIG. 13C | FIG. 13D |

FIG. 13D

| CHANGE THE DESTI-NATION IN THE PAGING MODE | | | | | |
|---|---|---|---|---|---|
| RESET THE ANSWERING MODE | SET THE AUTO FAX RECEPTION MODE | RESET THE AUTO FAX RECEPTION MODE | SET THE AUTO CHANGING MODE | RESET THE AUTO CHANGING MODE | |
| SET THE ROOM MONITOR MODE | RESET THE ROOM MONITOR MODE | SET THE SPEAKER MODE | RESET THE SPEAKER MODE | | |
| SKIP SEARCH FAST FEEDING | FAST DELETE | ALL DELETE | | EXIT | |
| | | | | | INPUT AFFIRMATION SECRET ID CODE |

FIG. 14

| # | DATE | TIME | MESSAGE, ETC. |
|---|------|------|---------------|
| 01 | '88/04/15 | 08:16 | 045-188-9599  YAMADA INC.<br>"MR. TAKENAKA" CALLED, AND<br>SAID "CALL ME BACK SOON". |
| 02 | '88/04/15 | 08:55 | 0433-08-3378  TAISHO INC.<br>"MR. SANO" CALLED,<br>ADDRESS OF THE MAGNETIC<br>TAPE IS "6674". |
| 03 | '88/04/15 | 09:37 | 0985-19-9824  MIYAZAKI INC.<br>ADDRESS OF THE MAGNETIC<br>TAPE IS "6115". |
| 04 | '88/04/15 | 10:01 | 0120-52-6800  TANAKA CO.<br>"MR. MADOGUCHI" CALLED, AND<br>SAID "SEE THE FAX LETTER I SENT."<br>ADDRESS OF THE MAGNETIC<br>TAPE IS "5803". |
| 05 | '88/04/15 | 10:55 | 0433-08-3378<br>"MR. OHRUI" CALLED |
|    | '88/04/15 | 11:59 | ----- PRESENT TIME |

FIG. 15

| No. | SECRET ID (4 FIGURES) | | | | | SENDERS' NAME (12 FIXED WORDS) | | | | | | | | | | | |
|---|---|---|---|---|---|---|---|---|---|---|---|---|---|---|---|---|---|
| 0 | 1 | 5 | 6 | 7 | | T | K | E | D | A | ] | ] | ] | ] | ] | ] | ] |
| 1 | 8 | 8 | 2 | 3 | | M | A | T | S | U | M | O | T | O | ] | ] | ] |
| 2 | 4 | 9 | 8 | 9 | | N | A | G | A | N | E | ] | T | ] | ] | ] | ] |
| 3 | 2 | 2 | 3 | 6 | | S | A | K | A | M | O | T | O | ] | ] | ] | ] |
| 4 | 8 | 7 | 3 | 0 | | I | J | U | N | ] | ] | ] | ] | ] | ] | ] | ] |
| 5 | 0 | 9 | 1 | 1 | | O | H | T | S | U | K | I | ] | ] | ] | ] | ] |
| 6 | 3 | 1 | 4 | 1 | | S | A | W | A | D | A | ] | ] | ] | ] | ] | ] |
| 7 | 2 | 7 | 1 | 8 | | N | A | K | A | N | O | ] | ] | ] | ] | ] | ] |

] IS A SPACE

FIG. 16

ANOTHER FIXED MESSAGE AREA FOR SENDER (32 FIXED WORDS x8)

] IS A SPACE

| | #0 | #1 | #2 | #3 | #4 | #5 | #6 | #7 |
|---|---|---|---|---|---|---|---|---|
| | I | I | I | C | I | I | I | I |
| | | | | A | | | | |
| | W | W | W | L | A | W | W | W |
| | I | I | I | L | M | I | I | I |
| | L | L | L | M | A | L | L | L |
| | L | L | L | Y | T | L | L | L |
| | | | | Y | T | | | |
| | G | G | V | P | P | B | G | T |
| | O | O | I | A | O | E | O | A |
| | | | S | G | I | | | K |
| | B | T | I | I | N | B | B | E |
| | A | O | T | N | T | A | A | |
| | C | | | G | A | C | C | A |
| | K | A | C | | | K | K | D |
| | | M | U | M | C | | | A |
| | H | I | S | A | O | B | B | Y |
| | O | | T | C | N | Y | Y | |
| | M | F | O | H | T | | | O |
| | E | A | M | I | A | N | 1 | F |
| | . | C | E | N | C | O | 8 | F |
| | ] | T | R | E | T | O | : | |
| | ] | O | S | . | | N | O | O |
| | ] | R | | ] | M | . | O | T |
| | ] | Y | O | ] | E | ] | . | O |
| | ] | . | F | ] | . | ] | ] | M |
| | ] | ] | | ] | ] | ] | ] | M |
| | ] | ] | L | ] | ] | ] | ] | O |
| | ] | ] | I | ] | ] | ] | ] | R |
| | ] | ] | S | ] | ] | ] | ] | R |
| | ] | ] | T | ] | ] | ] | ] | O |
| | ] | ] | A | ] | ] | ] | ] | W |
| | ] | ] | . | ] | ] | ] | ] | . |

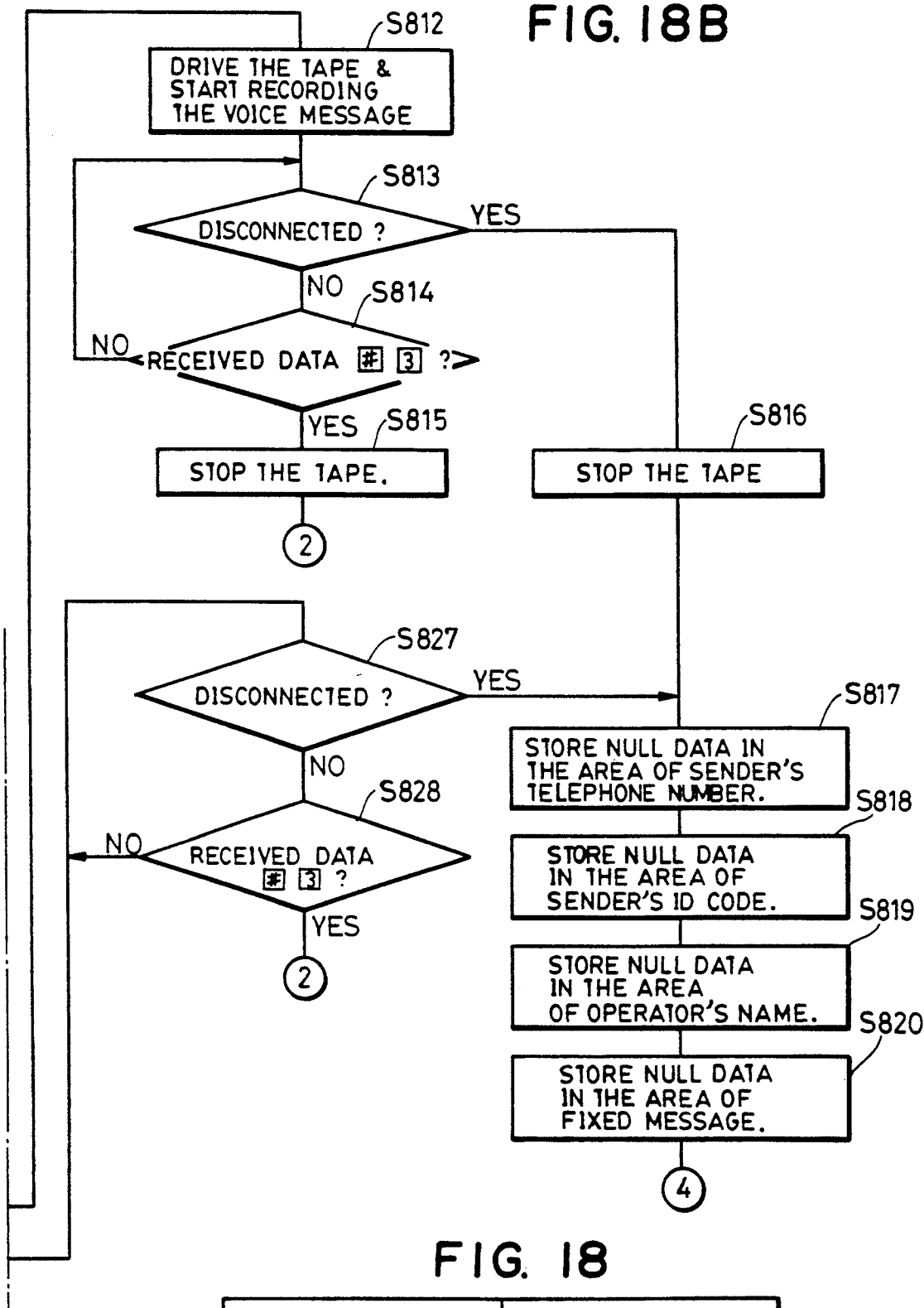

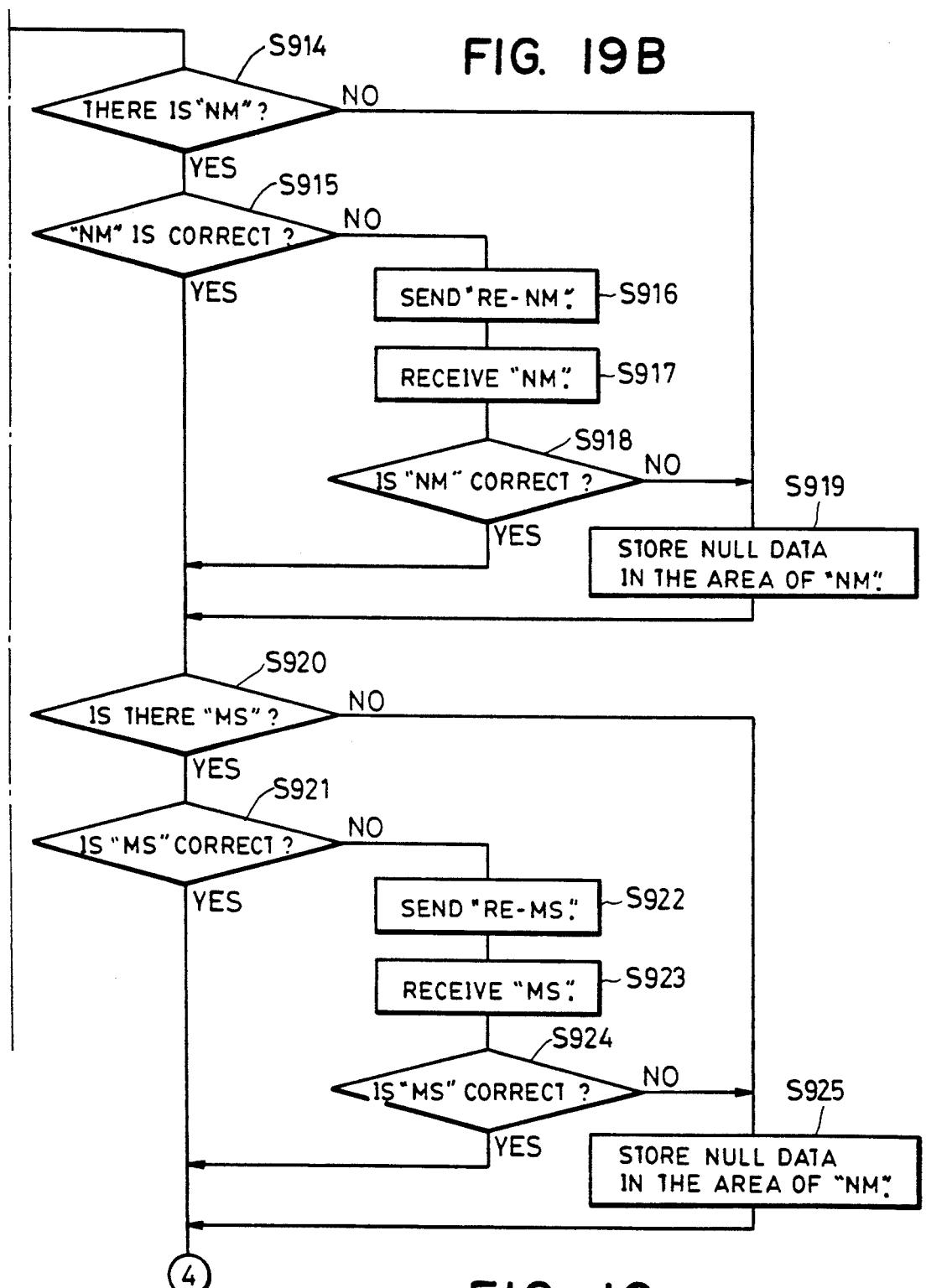

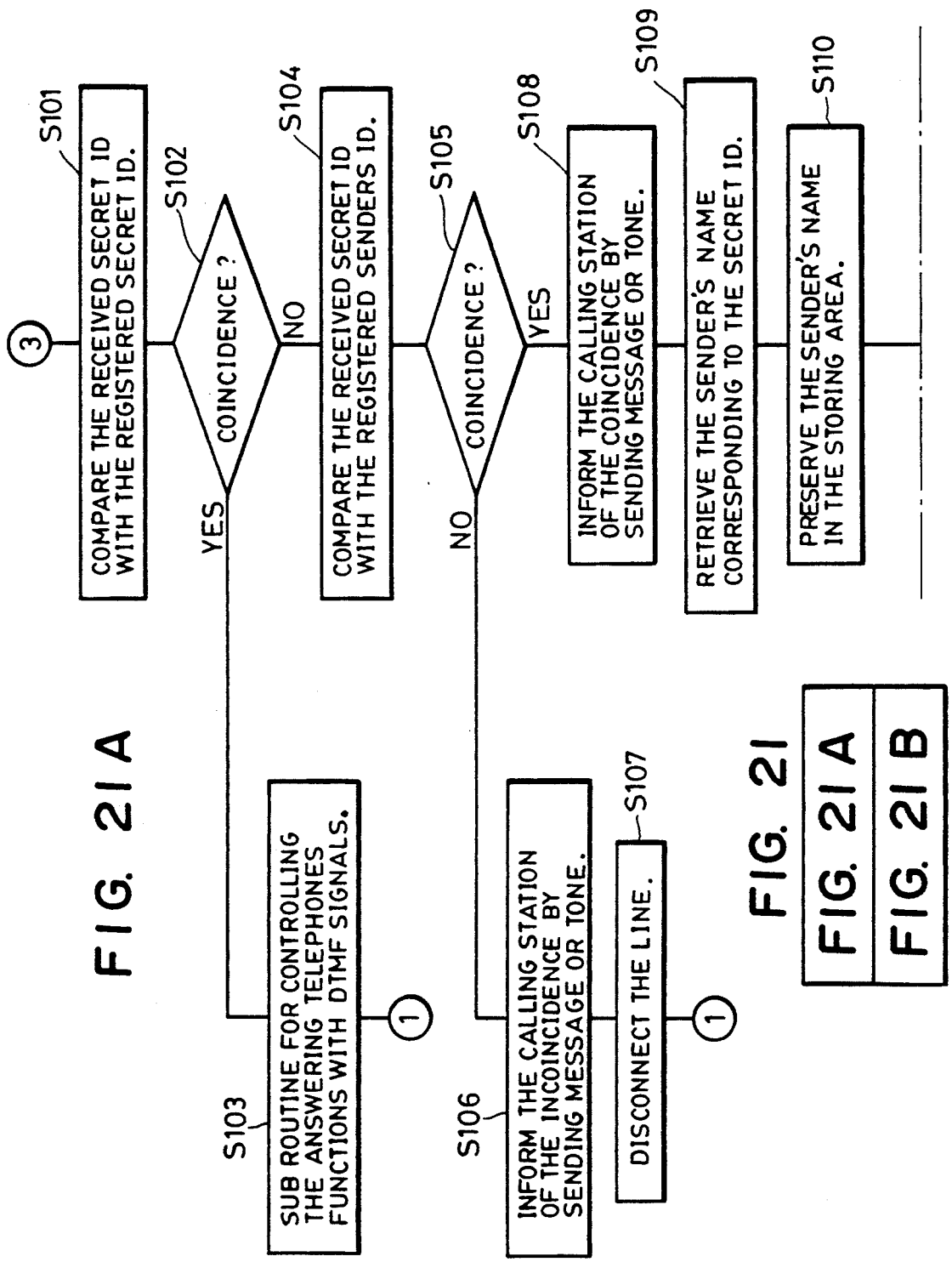

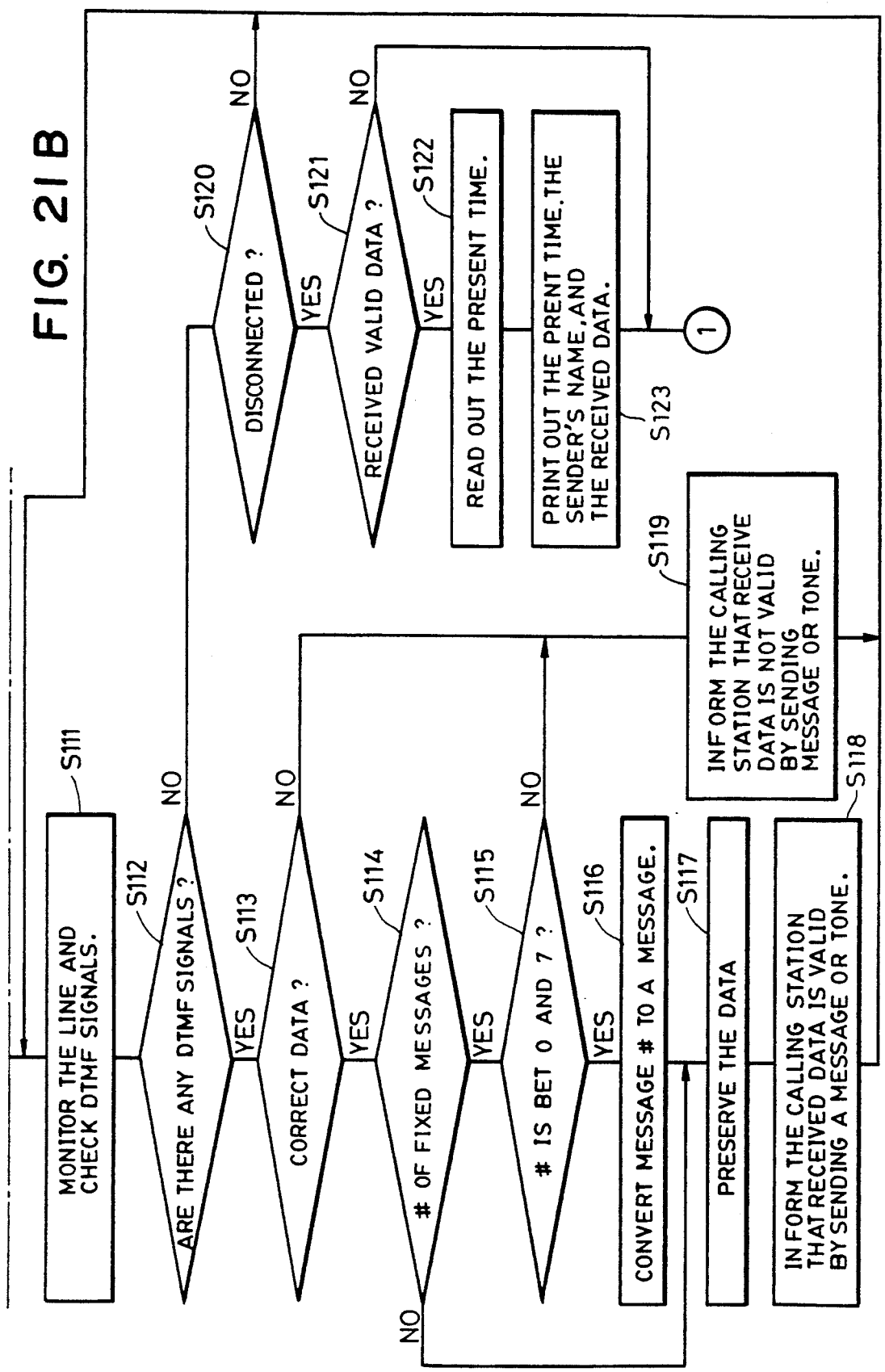

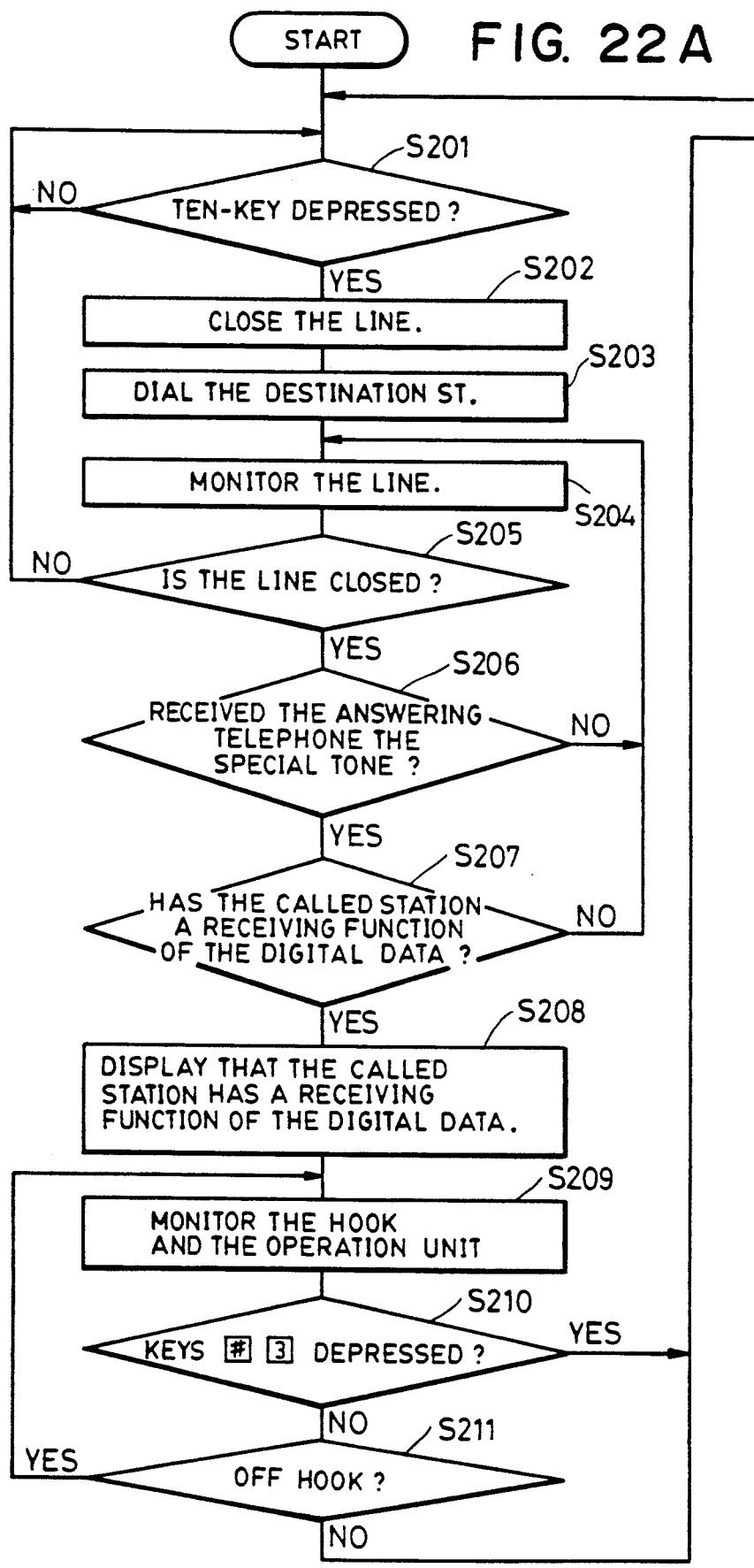

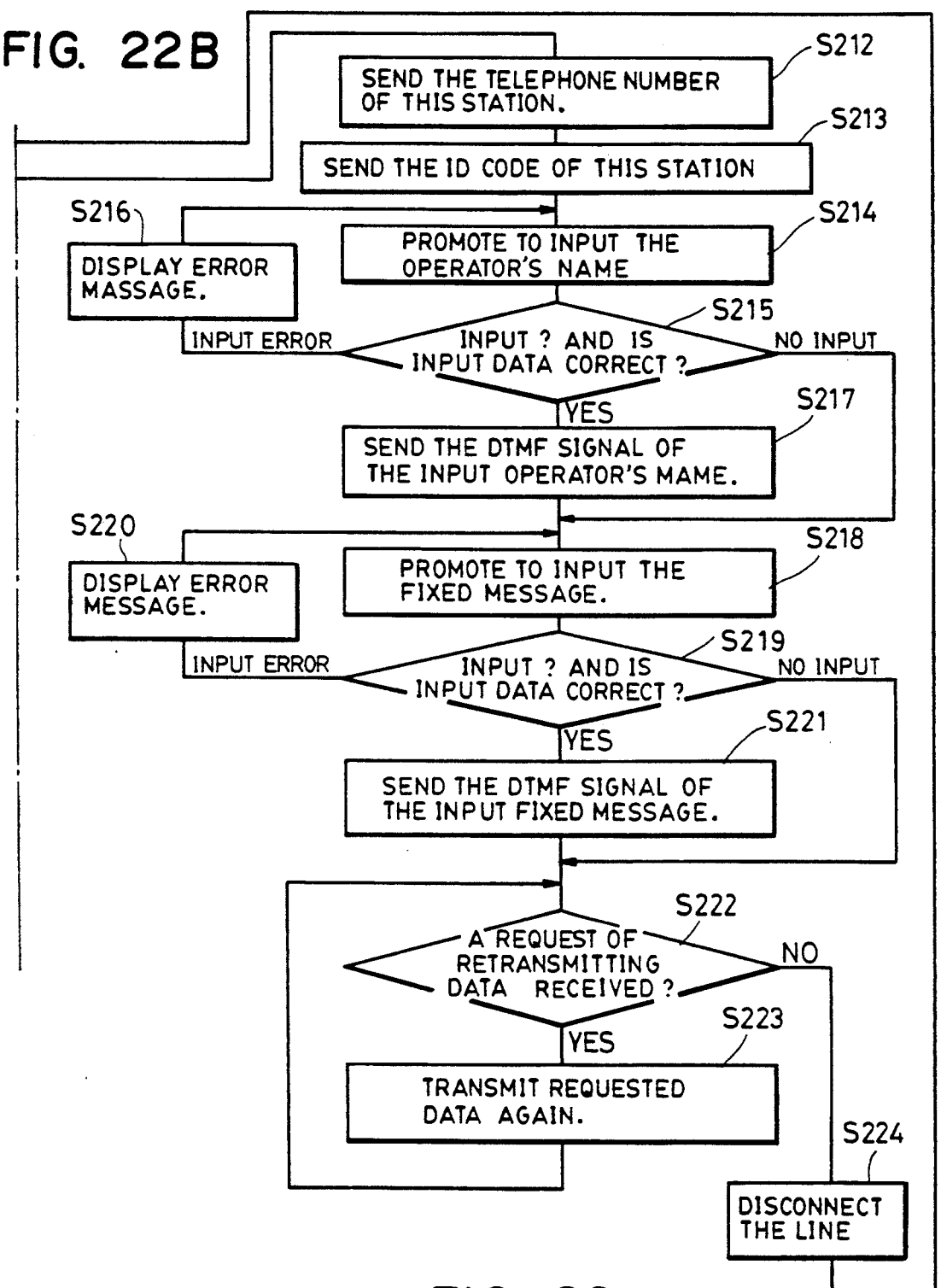

FACSIMILE APPARATUS

This application is a continuation of application Ser. No. 07/742,277 filed Aug. 8, 1991. now abandoned, which is a continuation application of application Ser. No. 07/404,961 filed Sep. 8, 1989, now abandoned.

BACKGROUND OF THE INVENTION

1. Field of the Invention

The present invention relates to a communication apparatus, and more especially relates to a telephone answering apparatus which is able to record messages received from a telephone line on a recording medium.

2. Description of the Related Art

A conventional telephone answering machine records messages sequentially in the order in which they are received, i.e., all the messages are dealt with as having the same value. Therefore, in the case that a plurality of messages are recorded, an operator cannot discriminate which message is more important before listening to all the messages.

Further, a conventional facsimile apparatus having a telephone answering unit (herein, the term "answering telephone" will, for convenience, be used to denote any device or component which serves to take a call coming over a telephone line and record a message received via the call) has only one controller (Central Processing Unit: CPU) which controls not only facsimile transmission and reception but also voice recording and reproducing of the answering telephone. Therefore, if the controller controls the answering telephone to reproduce a voice message during facsimile communication, the controller discriminates whether an operation key is depressed or not and controls the answering telephone in an interrupting routine.

In a conventional facsimile apparatus having the answering telephone, however, the burden on the controller in executing the interrupting routine during the facsimile communication is too great, and the reliability of the facsimile communication is not as high as might be desired.

SUMMARY OF THE INVENTION

A purpose of the present invention is to provide a communication apparatus which overcomes the above-mentioned shortcomings of the conventional communication apparatus.

Another object of the present invention is to provide a communication apparatus which records information peculiar to another station in addition to a voice message received from the other station, which two bodies of information are to be recorded in connection with each other.

Another object of the present invention is to provide a communication apparatus which includes a first controller to control image data communication, and a second controller to control voice communication, both of which control independently.

Another object of the present invention is to provide communication apparatus which includes a first controller to control voice communication, and a second controller to control image data communication and the outputting of received image data, wherein the second controller also controls the outputting of information related to the voice communication.

There are, of course, additional features of the invention that will be described in the detailed description of the preferred embodiments, taken with reference to the accompanying drawings. Those skilled in the art will appreciate that the conception upon which this disclosure is based may readily be utilized as a basis for designing other structures or methods for carrying out the purposes of the invention. It will be understood that the claims are to be regarded as including such other constructions and methods as do not depart from the spirit and scope of the invention.

BRIEF DESCRIPTION OF THE DRAWINGS

FIG. 1–1B is a block diagram showing a structure of a first embodiment;

FIG. 5 is a table of a JIS eight-unit code;

FIG. 8 is a drawing showing a state of fixed messages in a memory;

FIG. 9 is a drawing showing a state of names of operators in a memory;

FIG. 10 is a drawing showing a relation between keys and dual tone multi-frequency (DTMF) signals;

FIG. 11 is a drawing showing an example of communication data;

FIG. 12 is a drawing showing an example of compressed communication data;

FIG. 13–13D is a table showing a total control system of DTMF signals;

FIG. 14 is a drawing showing an example of a reception list;

FIG. 15 is a drawing showing a state of senders' names and their secret identification numbers in a memory;

FIG. 16 is a drawing showing a state of other fixed messages in a memory;

FIG. 18 through FIG. 23 are flowcharts showing a control program of the first embodiment;

DETAILED DESCRIPTION OF THE PREFERRED EMBODIMENTS

First Embodiment

Figure 1B:
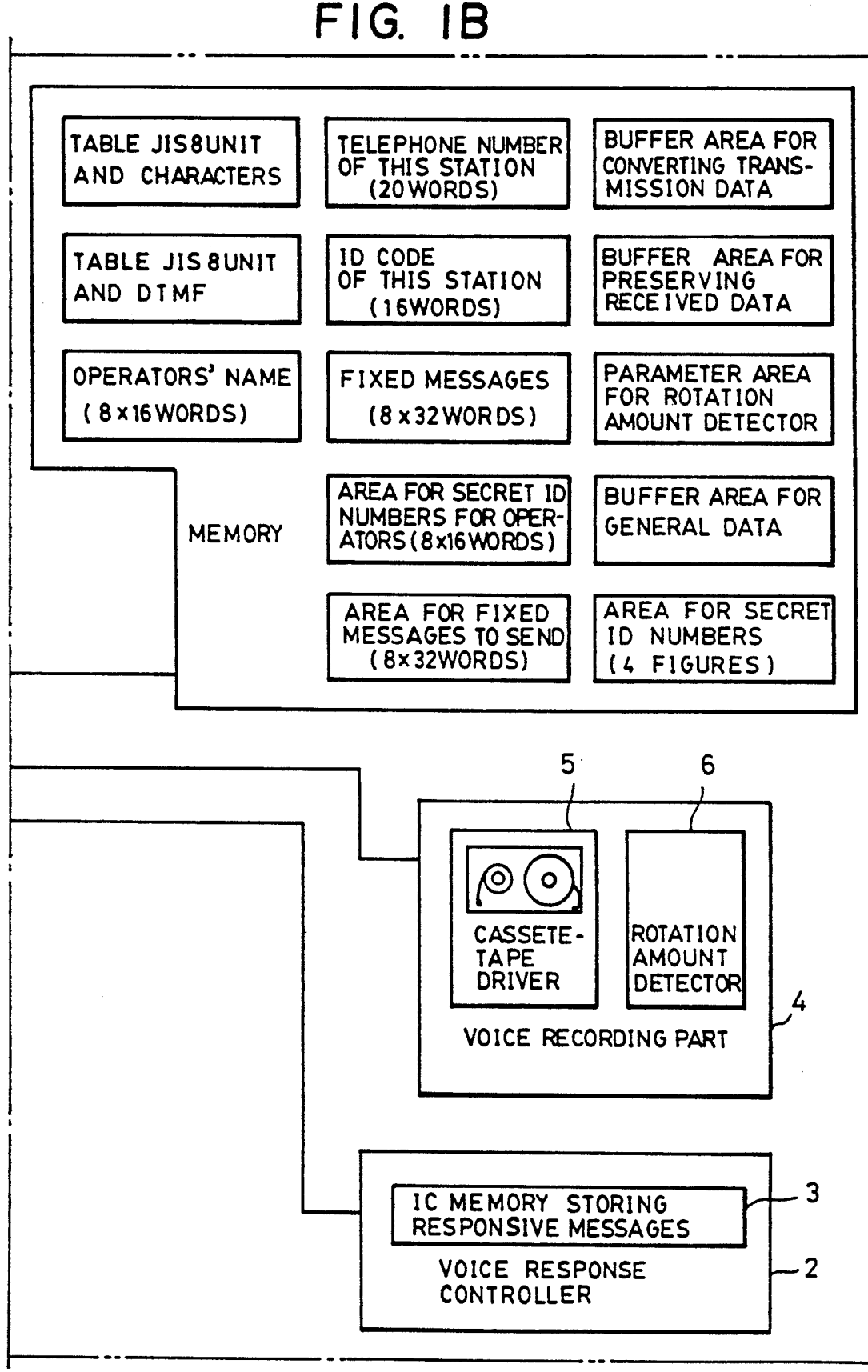

FIG. 1 shows a block diagram of a facsimile apparatus with a telephone answering unit. The facsimile apparatus responds with voice, which is produced from a signal D/A (Digital/Analog) converted from output of an IC (Semi-Conductor) memory 3 by a voice response controller 2, and which after such conversion is output to a communication line. Also, a message is recorded on a magnetic tape in an audio cassette as analog information.

The facsimile apparatus with the answering telephone includes a main controller 1, a voice-response controller 2 for selecting an appropriate voice response message to be sent to a calling station from the IC memory 3, a voice-recording part 4 for recording the message from the calling station on a cassette tape (i.e., on the magnetic tape), a telephone unit 7 having a speech network 8 and a dialer 9, and a DTMF (Dual Tone Multi-Frequency) generator 10. The voice-recording part 4 has a cassette-tape driver 5 for driving the cassette tape and a rotation amount detector 6 for detecting rotation amount of the cassette tape.

Further, an image recording part 11 for printing out images on thermal paper, an image reader 12 for reading original images, an operation unit 13 having a display panel 17 and key-switches 18, a memory 14 for storing various kinds of information, a clock 15, and a network control unit (NCU) for controlling connection of the communication line are provided.

In this embodiment, the main controller 1 has a conversion-transmitting function for converting its telephone number, an identification code or other codes (either stored in the memory 14 or key-input), to signal sequences or strings in voice-band frequency, e.g., DTMF signal, and for sending the signal strings to the other station. This conversion-transmitting function of the main controller 1 is actuated by operation of a special key input (e.g. "#3") or by a designation signal (special tone) from the second station. In either case, the main controller 1 causes the display panel 17 to display the reception of the destination signal.

In addition, the main controller 1 has a restoring function, for decoding ("restoring") the signal string to the original code(s) or number(s) with the same converting format as in the other station.

The main controller 1 sorts the restored code string into groups comprising, respectively telephone number, identification code, code sequence from a memory of the other station, and code sequence key-input at the other station, and stores these sorted code strings in the memory 14 with date and time information indicating when they were received. The main controller 1 causes the image recording part 11 to record the stored information on the thermal paper when the number of groups of information is over a predetermined number or when a predetermined time has elapsed. After being recorded, the information is erased from the memory 14. The main controller 1 also has a function for sending a special tone before and/or after a message from a sending station is recorded.

The main controller 1 has, in addition, a preserving function for preserving address information indicating where on the recording medium the message and the other code information corresponding to the voice message and stored therewith.

If an operator enters a command through the operation unit 13 to erase the address information, the main controller 1 causes the contents of the voice message corresponding to the address information to be erased.

Detection of Address of Magnetic Tape

The cassette-tape driver 5 includes, as mentioned above, a rotation amount detector 6 which detects the present position ("address") of the cassette tape. The position of the cassette tape is accessed using a one-dimensional access method, so that the position of the cassette tape can be designated by time elapsed since the start of the rotation of the cassette tape from an initial position, or by how long it would take to wind the tape up from its present position to an end position of the rotation. In this embodiment, the rotation amount detector 6 measures the number of rotations through which the cassette-tape reel has turned to reach its present position from its initial position.

Figure 2:
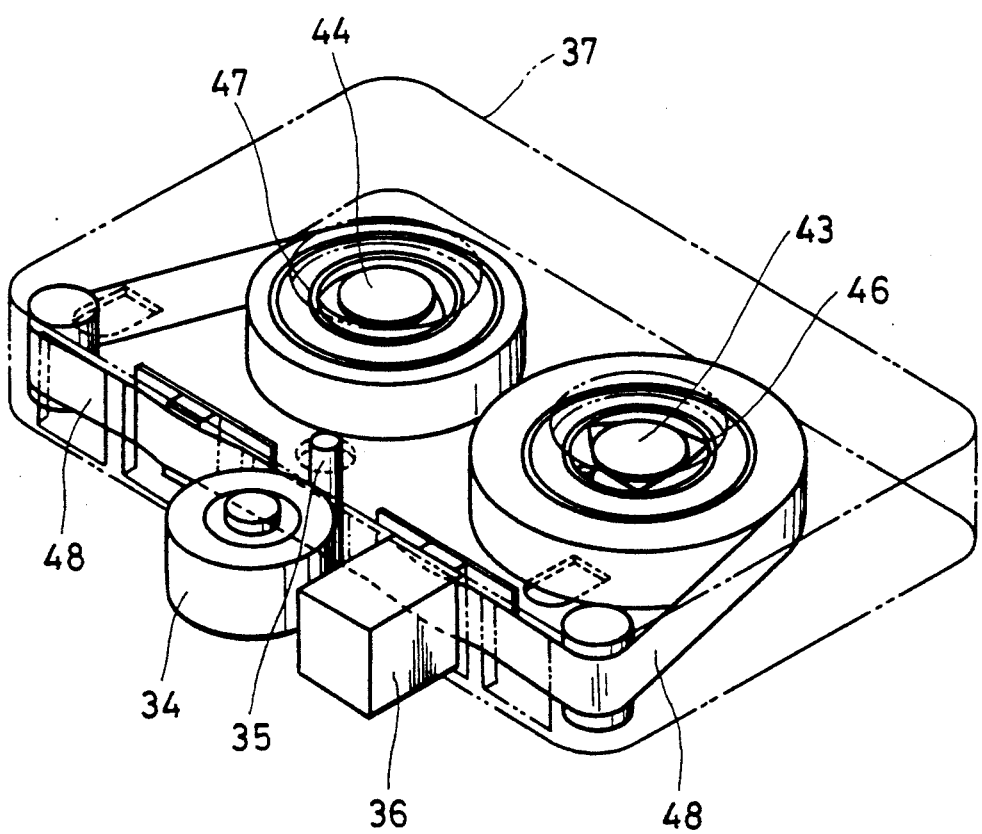
FIG. 2 is a perspective view of a cassette tape driver.
Figure 3:
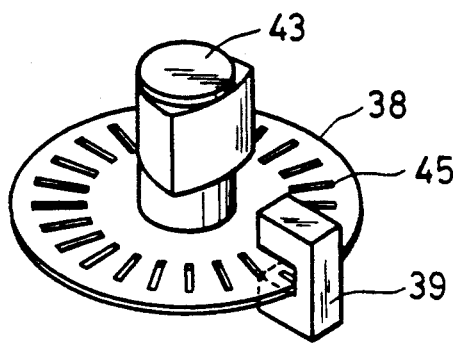
FIG. 3 is a perspective view of a rotation amount detector.

FIG. 3 shows a perspective view of the rotation amount detector 6. The rotation amount detector 6 includes a thin, non-transparent disc 38 having a plurality of narrow slits extending radially and going through the thickness of the disc 38. The disc is attached to a reel bobbin 43 of a supplying reel 46 (see FIG. 2). A photo-sensor 39 having an LED (Light Emitting Diode) and a photo-transistor is also provided, and is installed so that light can pass from the LED to the photo-transistor through a slit 45 when one of the slits is aligned with the LED and the phototransister. Thus, the disc 38 with the slits 45 and the photo-sensor 39 serves as a rotary-encoder.

Figure 4:
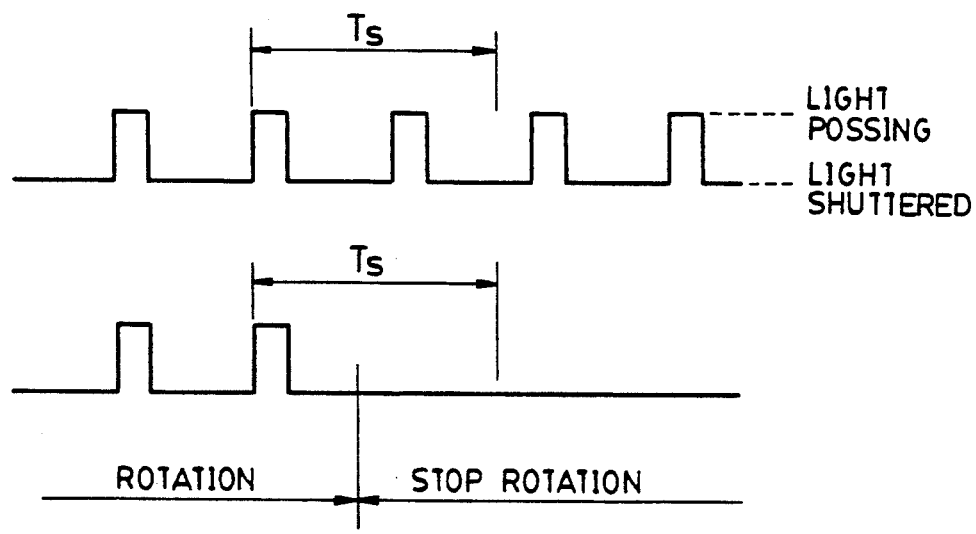
FIG. 4 is a timing chart showing a sequence of detecting rotation amount.

The applying reel 46 is rotated, and the rotation of the reel 46 is transmitted to the reel bobbin 43. Then the disc 38, which is constructed with the bobbin 43 in a unitary body, rotates in synchronism with the reel 46. During the rotation of the disc 38, the photo-sensor 39 outputs a rectangular wave signal as shown in FIG. 4(a), because the slits 45 intermittently permit the light from the LED to reach the photo-transistor.

The rotation amount detector 6 described above is attached to the reel bobbin 43 of the supplying reel 46 in the cassette-tape driver 5 shown in FIG. 2.

During a playback mode of the cassette-tape driver 5, the magnetic tape is supplied from the supplying reel 46 to a wind up reel 47, and magnetic recorded information is picked up by a magnetic head 36 as an electrical signal. During the playback mode, unless the feeding speed of the magnetic tape 48 is fixed, signal distortion, e.g., wow or flutter, occurs. Therefore, a capstan roller 35 which is directly attached to a fly wheel and a pinch roller 34 which presses the magnetic tape 48 against the capstan roller 35 are provided to stabilize the feeding speed of the magnetic tape 48. These two rollers 34 and 35 cooperate to feed the magnetic tape 48 with a fixed speed. A reel bobbin 44 of the wind up reel 47 is supplied with power so that the winding speed of the tape is set a little bit faster than the feeding speed of the magnetic tape 48. However, a slide clutch (not shown) is provided in the reel bobbin 44, so that the magnetic tape is not fed with the winding speed, and the winding speed simply applies a suitable tension to the magnetic tape 48.

The reel bobbin 43 of the supplying reel 46 is not supplied with rotation power, but with friction power to restrain the feeding of the magnetic tape. However, this friction power is not so much as actually to affect the feeding speed of the magnetic tape 48, but is merely enough to keep the magnetic tape from bending or becoming loose or slack. Therefore, the reel bobbin 43 is rotated according to the rotation of the supplying reel 46 depending on the feeding speed of the magnetic tape 48, during the playback mode. At this time the disc 38 rotates with an almost constant speed, and the light path of the photo-sensor 39 therefor is intermittently interrupted by the disc 38 and the slits 45 thereof. The photo-sensor 39 repeatedly outputs the rectangular wave signal shown in FIG. 4(a) with almost a uniform period.

However, when all the tape wound up around the supplying reel 46 has been fed to the winding up reel 47, the tape stops feeding even if the capstan roller 35 attempts to continue feeding it with the same speed, because the end of the tape is fixed to the supplying reel 46. In this situation, since neither the supplying reel 46, the reel bobbin 43 nor the disc 38 rotates, the output of the photo-sensor 39 becomes and remains constant at one level as shown in FIG. 4(b). The main controller 1 always monitors the output of the photo-sensor 39, and when the output of the photo-sensor 39 remains at a constant level for a predetermined period, e.g., time Ts shown in FIG. 4(b), the main controller 1 discriminates that all the tape has been wound up, and stops the driving of the magnetic tape.

While the above explanation relates to the playback mode, the cassette-tape driver 5 and the rotation amount detector 6 operate during the recording mode as well as during tee playback mode.

During a fast-forward mode of the cassette-tape driver 5, reel bobbin 44 of the winding up reel is driven to rotate and reel bobbin 43 is rotated according to the rotation of the winding up reel 47. During this, the main controller 1 checks the output of the photo-sensor 39 as well as during the playback mode. But, during the fast-forward mode, the feeding speed of the tape 48 is not stabilized, and the photo-sensor 39 outputs the signal at intervals that are not almost periodic. Therefore, the time period Ts', which is the criterion for determining when the tape has been completely wound up in the fast-forward mode, should be set taking such irregularity or aperiodicity into account.

Taking the end of the magnetic tape as a last address for tape position, any position of the tape can be defined uniformly as an address which is a number of varying signals of the photo-sensor 39 from the last address, and the desired position of the tape can be accessed by counting the number of the varying signals according to the last address and the desired address.

It should be noted that the resolution with which it is possible to distinguish between consecutive addresses depends on the size of the slits 45 and the width between adjacent slits. Thus, if possible, the main controller 1 controls the magnetic head 36 to reserve a portion of the tape as a non-signal part and to record address data on the magnetic tape 48. In use, the main controller lets the magnetic head 36 search the non-signal part and the address data while fast forwarding the tape, so that it is possible to access the desired position more accurately.

Transmission of the Digital Data

The main controller 1 controls both an answering telephone function, and a facsimile function collectively. In the memory 14 of the main controller 1, various data and parameters being used for communication protocol of the facsimile function are stored. Although a facsimile apparatus need not send its telephone number and identification code to the other station, and doing so is defined as an optional function by the recommendation GIII of CCITT, recently, most facsimile apparatus have these optional functions. In this embodiment, the telephone number and the identification code of the apparatus are stored in the data area of the memory 14. More concretely, in the phase B of the GIII communication protocol the telephone number is transmitted to the other party as a CIG (Calling Subscriber Identification) signal, and the identification code is set in an NSC (Non-Standard Facsimile Command) signal which is an area manufacturers of facsimile apparatus may define freely.

Figure 6:
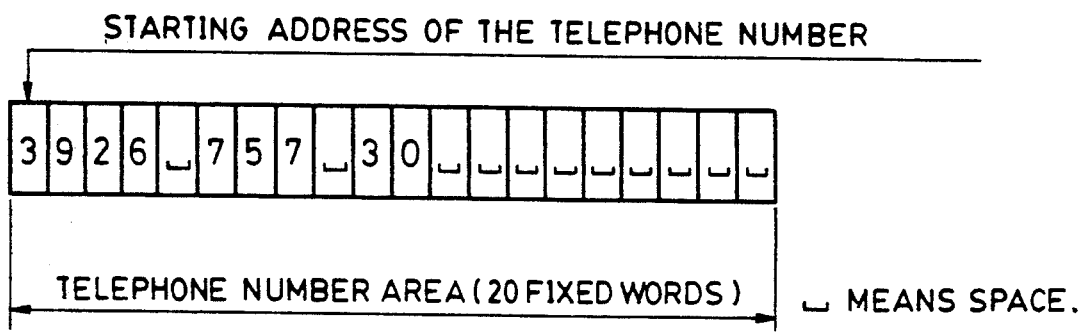
FIG. 6 is a drawing showing a state of a telephone number in a memory.
Figure 7:
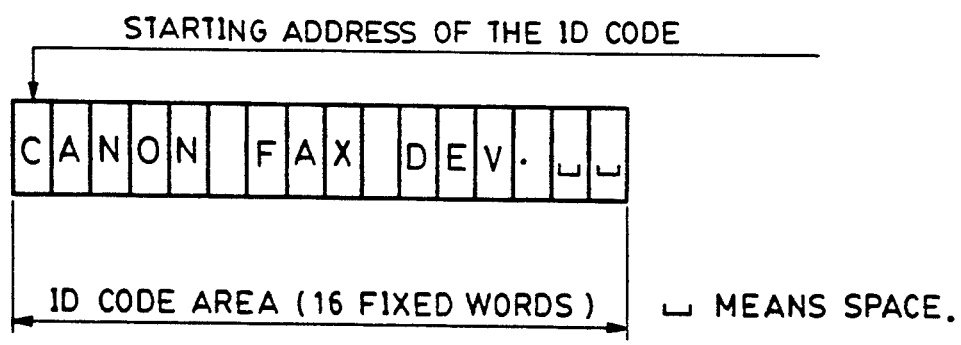
FIG. 7 is a drawing showing a state of an identification code in a memory.

FIG. 6 shows an example of the CIG signal stored in the memory 14 according to a format of the CIG signal, and each column of FIG. 6 is defined as a code signal according to the code table of 8 units of the JIS (Japanese Industrial Standard) shown in FIG. 5. In this embodiment, the number of columns is set at 20. The identification code is not a specified communication format, and in this embodiment the identification code is defined as shown in FIG. 7. The number of columns of the identification code is set at 16 in this embodiment, and each column has a character defined according to the code table of the JIS shown in FIG. 5.

In the case that there are fixed messages to be used in communicating the operator's intention to another operator, up to eight such fixed messages can be provided in memory, as shown in FIG. 8. Each message has up to 32 columns and is defined by characters according to the JIS code as well as the identification code. Usually, a few such fixed sentences suffice, and therefore five messages (#0 through #4) are set fixedly by the manufacturer, while the contents of the other three messages (#5 through #7) can be set by the operator freely in accordance with circumstances. One of these eight messages is selected and drawn by actuation of a key of the operation unit 13 when needed.

In a case that the apparatus is used by a plurality of operators, one of the operators can be specified. In this embodiment, eight different operator names can be set in areas #0 to #7 of the memory 14 as shown in FIG. 9. Each area has 16 fixed columns whose contents are defined according to the JIS eight-unit code. The operator also selects one of the codes by activating a key of the operation unit 13 when needed.

This code information is converted to a DTMF signal using the following method. The DTMF signal, which is used in tone-dialer telephones, is a combination of one of three higher-frequency tones (1209 Hz, 1336 Hz and 1447 Hz) and one of four lower-frequency tones (6974 Hz, 770 Hz, 852 Hz and 941 Hz). Thus, there are twelve kinds of signals possible, which are allotted to twelve telephone keys of the tone-dialer, i.e., ten keys (0~9), and special keys * and #. One of the three higher-frequency tones and one of the four lower-frequency tones are generated simultaneously by way of sending the signal.

One DTMF signal requires at least 50 milliseconds, and the no-signal period between two signals has to be more than 30 milliseconds long, according to the standard.

This DTMF signal is not only used for dialer signals but also for making reservations on trains and airplanes, so that this signal can be used for simple data transmission means. Of course, this signal is not suitable for mass transmission, but when information of up to one hundred words or so is transmitted, as in this embodiment, this signal is very useful because it takes less than one minute to send it.

When data is sent, the operator may (but need not) select one or more names of operators and/or one or more of the fixed messages stored in the memory 14, whereas the operator does not select or input the telephone number and the identification code, because they are peculiar to the apparatus. The key switches of the operation unit 13 are used for selecting the stored message and operator name. However, the operator has not to select the fixed messages and the names of operators. As an example, there will be explained the case in which message #0 in FIG. 8 and operator name #4 in FIG. 9 are selected, as follows.

First, the data containing the telephone number, the identification code, the operator name, and the fixed message is arranged as shown in FIG. 11. Each of these four pieces of data has a special character code:

TN=Telephone Number
ID=Identification Code
NM=Name (Name of Operator)
MS=Message (Fixed Message)

These codes are arranged at the top of each data, and each collection of data having these codes is called a data block. At the end of each data block there is a special code ETX (End of Text: Code "03 (Hex)" in JIS Code) showing the end of the block, and another code STX (Start of Text: Code "02" in JIS Code) showing the start of a block is arranged just before the first piece of data of each block. These special codes are selected from among "00"~"11" (see the code table of the JIS in FIG. 5), which have not been defined in the standard, and are usually not used. Then, characters having no meaning (e.g., a space which is placed at the last position in each piece of data) are removed, and the data is compressed as shown in FIG. 12.

If no fixed message or no operator name is selected, the special character codes, MS NM (including the codes STX and ETX described above) are also omitted, respectively. If no fixed message or no operator name has been defined, i.e., all the data for a fixed message or for the name is space characters, and these special character codes are also omitted. On the other hand, if a plurality of fixed messages and/or a plurality of operator names are selected, they are arranged in the order of selection or in the order of their numbers #0 through #7. Each fixed message or each name of an operator makes one block of data respectively.

Then, this character and code arrangement is modified or encoded with DTMF signals. In this embodiment, the apparatus is arranged such that the apparatus can be remote-controlled with DTMF signals from the outside telephone to control the answering tape recorder to play back the messages or to control setting mode. In order not to confuse control DTMF signals with data DTMF signals, the outline of the DTMF signals should be regulated, e.g., as shown in FIG. 13. Thus, the DTMF signals showing each character are modified to three-digit DTMF signals. However, the special character code signals TN, ID, NM and MS are very important signals showing the end of each piece of data, and therefore are modified specially, to be safe. These signals are allotted "40" to "43" in FIG. 13.

EXAMPLE 1

Block:

| ID | STX | C | a | n | o | n | ETX |

Converted to:

| ID | STX | C | a | n | o |
| #4 1 | 0 0 2 | 0 6 7 | 0 9 7 | 1 1 0 | 1 1 1 |

| n | ETX |
| 1 1 0 | 0 0 3 |

Thus, all the characters and codes are expressed as three-digit signals. The total number of characters and codes in the example shown in FIG. 12 is 69, and each of them has three DTMF signals. Assuming it takes 120 milliseconds to transmit one DTMF signal, it takes $$69 \times 3 \times 0.12 = 24.84 \text{ seconds}$$

to send all the characters and codes. In this fashion, all the characters and codes shown in FIG. 12 are converted to DTMF signals and are transmitted to the communication line.

If the other station sends a request to have this station send the telephone number, the identification code, the operator name or fixed message (Re-TN, Re-ID, Re-NM, Re-MS) by DTMF signals (the request may be, e.g., Re-NM) the main controller 1 retrieves the NM code in FIG. 12, and sends the data between next code STX and next code ETX. These requests are used when the condition of the communication line is not good and the other station cannot receive the data correctly.

If no fixed message is selected and the other station sends a request to send such a fixed message, then a null character:

| MS | STX | ETX | is sent.

The main controller 1 causes the memory 14 to store data arrangements TX (Extra - Text) which are input by key operation or which are sent by another communication, and the main controller 1 can send these stored TX's as well as the fixed message. This function also can be selected by a key operation of the operator unit 13. The TX is also used for a non-fixed message or a fixed message from the other telephone, as explained below.

The received DTMF signals are decoded to the JIS code by using the conversion table of FIG. 13 in reverse.

Figure 19A:
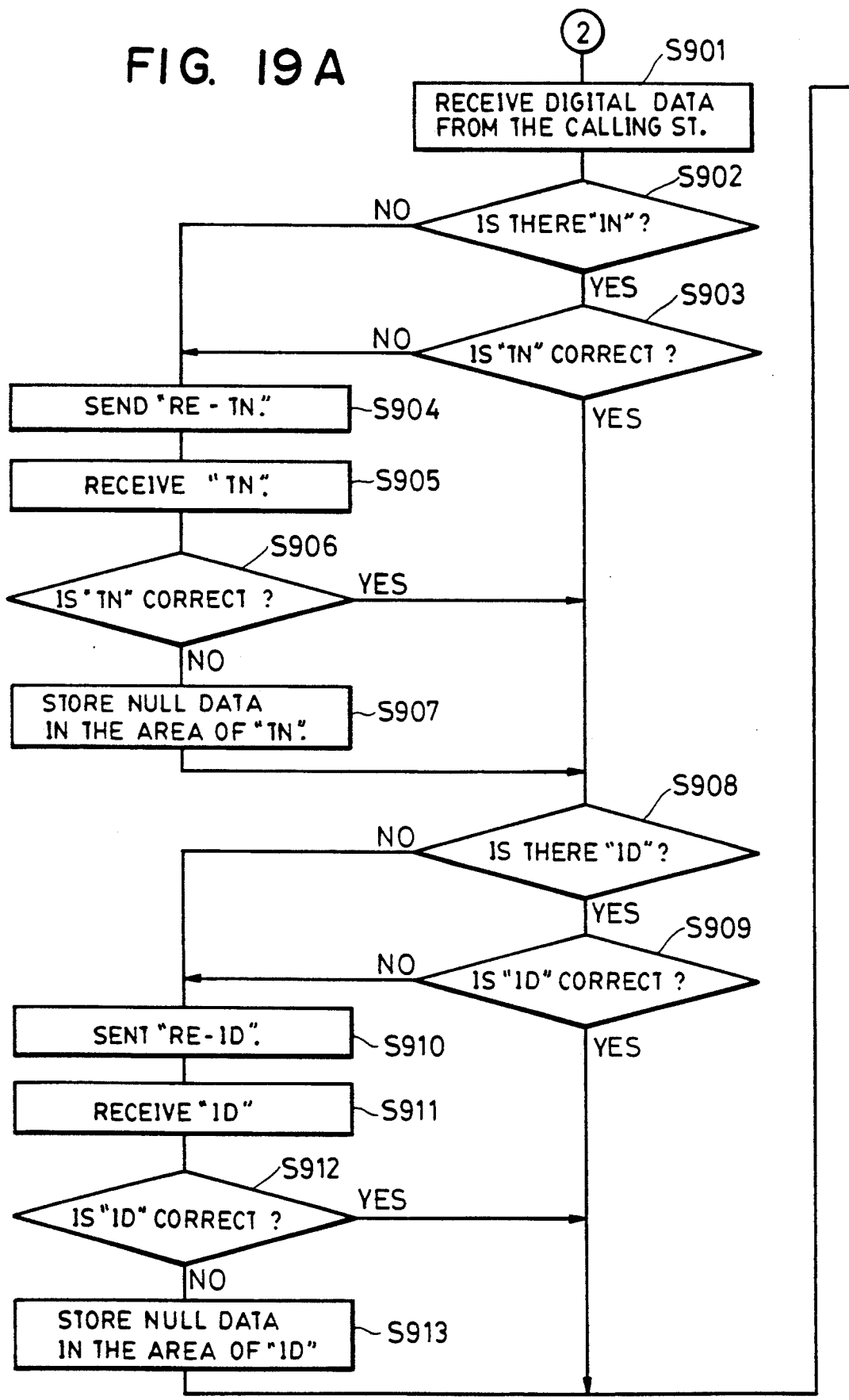

With reference to FIG. 19, reception of the data is explained as follows.

The main controller 1 receives digital data from the calling station (S901), and then retrieves the code TN (S902). If the code TN is received, the main controller 1 searches for the code STX just after the code TN, and then searches for the code ETX or the DTMF signal "#" after the code STX. If the main controller 1 cannot find the code ETX before the DTMF signal is found or before the searching operation is over, the main controller 1 discriminates that there is some error in the receiving operation. On the other hand, if the main controller 1 finds the code ETX, the main controller 1 confirms if the number of DTMF signals is a multiple of three, and if every character between the codes STX and ETX is one defined by the JIS eight unit code. To put it concretely, a check is made as to whether there are some characters expressed with "80" (Hex) through "9F" or "E0" through "FF" which are not defined by the JIS code as shown in FIG. 5 (S903). If there are any such undefined characters or if the number of characters is not a multiple of three, the main controller 1 determines that there is a reception error and sends a retransmission request Re-TN to the calling party to resend the data (S904).

The main controller 1 receives the telephone number again (S905), and re-checks whether the data received is correct or not (S906). If the data is still not correct, the main controller 1 makes the column for the telephone number blank (S907).

The main controller 1 retrieves the codes of the identification code, of the operator name and the fixed message as well as the code of the telephone number (S908 through S925).

Figure 20:
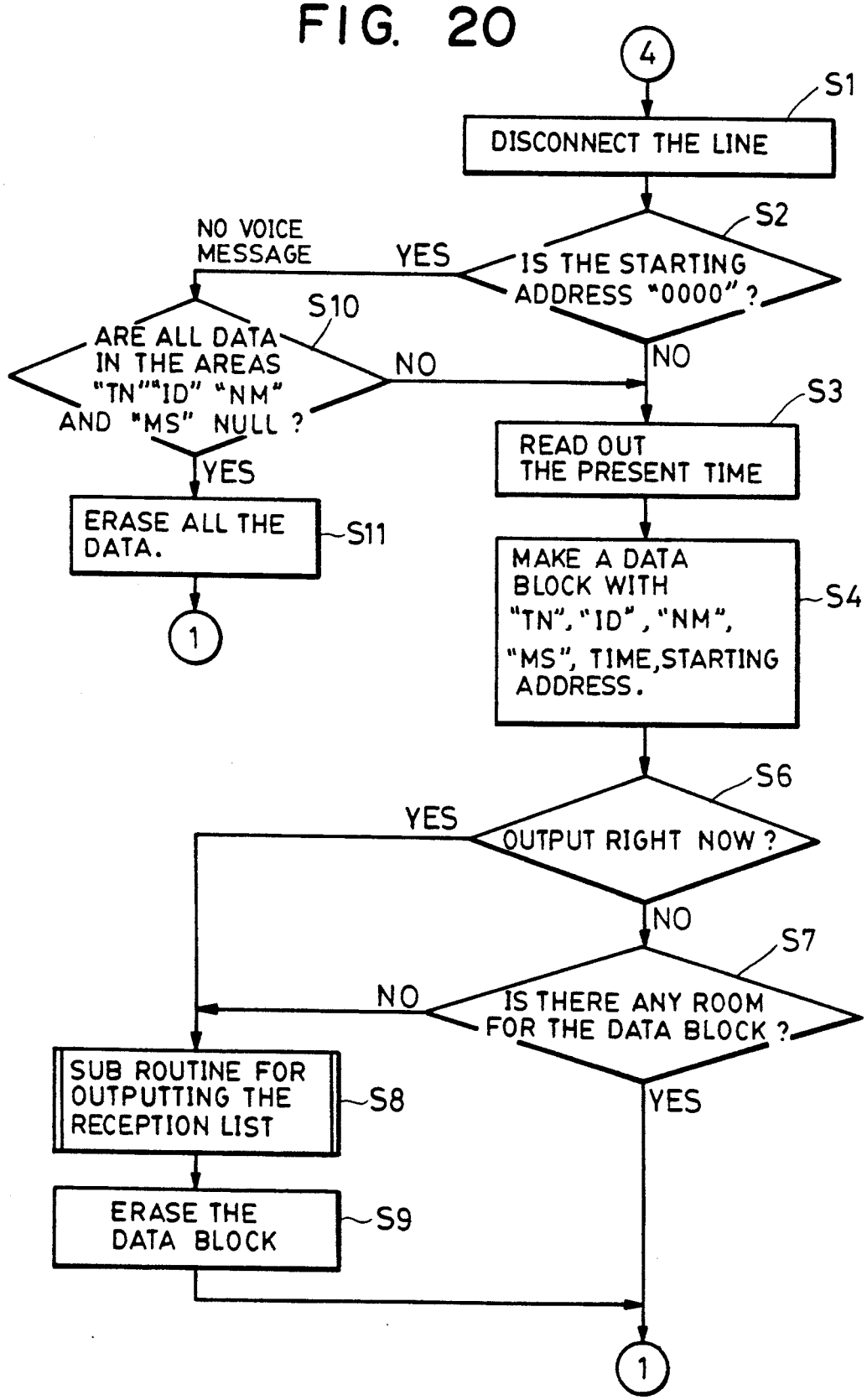

Upon determining that all the data has been received correctly, the main-controller 1 reads out the present time from the clock 15 in step S3 (FIG. 20). In step S4 of FIG. 20, the main controller 1 causes the memory 14 to store and preserve the data received, the time of reception of the data, and the starting address of the magnetic tape (if there is any other voice message from the other party as described below), all together in a block.

The Operation of the Calling Station

The operation of the calling station is explained as follows, referring to FIG. 22.

When the main-controller 1 of the calling station detects depression of the dial keys of the operation unit 13 (S201), the maincontroller 1 controls the NCU16 to close the communication line (S202), and to dial the destination station. The main controller 1 monitors the communication line (S204), and waits for a special tone from the destination station having an answering telephone (S206). This special tone indicates that the destination station has a function to be able to receive digital data. When the main controller 1 detects the special tone (S207), the main controller 1 causes the display 17 to display an indication thereof (S208).

Then the main controller 1 monitors a hook switch (not shown) to determine whether a handset (not shown) of the telephone is on hook or not, and an operation panel 13 (S209). When it is detected that the handset is on-hook (S211), or when the key operation |#| |3| occurs (S211), the telephone number and the identification code of the calling station are sent to the communication line (S212 and S213).

The main controller 1 prompts the operator to input the operator name and discriminates the input name (S215). If the input data is not correct, the main controller 1 causes the display 17 to display a message showing input errors (S216). If the input data is correct, the main controller 1 transmits the operator name which is converted to DTMF signals (S217). The main controller 1 sends the fixed message as well as the operator name (S218 through S221).

On receiving the retransmission request Re-TN, Re-ID, Re-NM or Re-MS, the main controller 1 sends the data which is requested by the destination station (S223). If there are no re-transmission requests, the main controller disconnects the communication line (S226).

The Operation of the Called Station

Figure 18A:
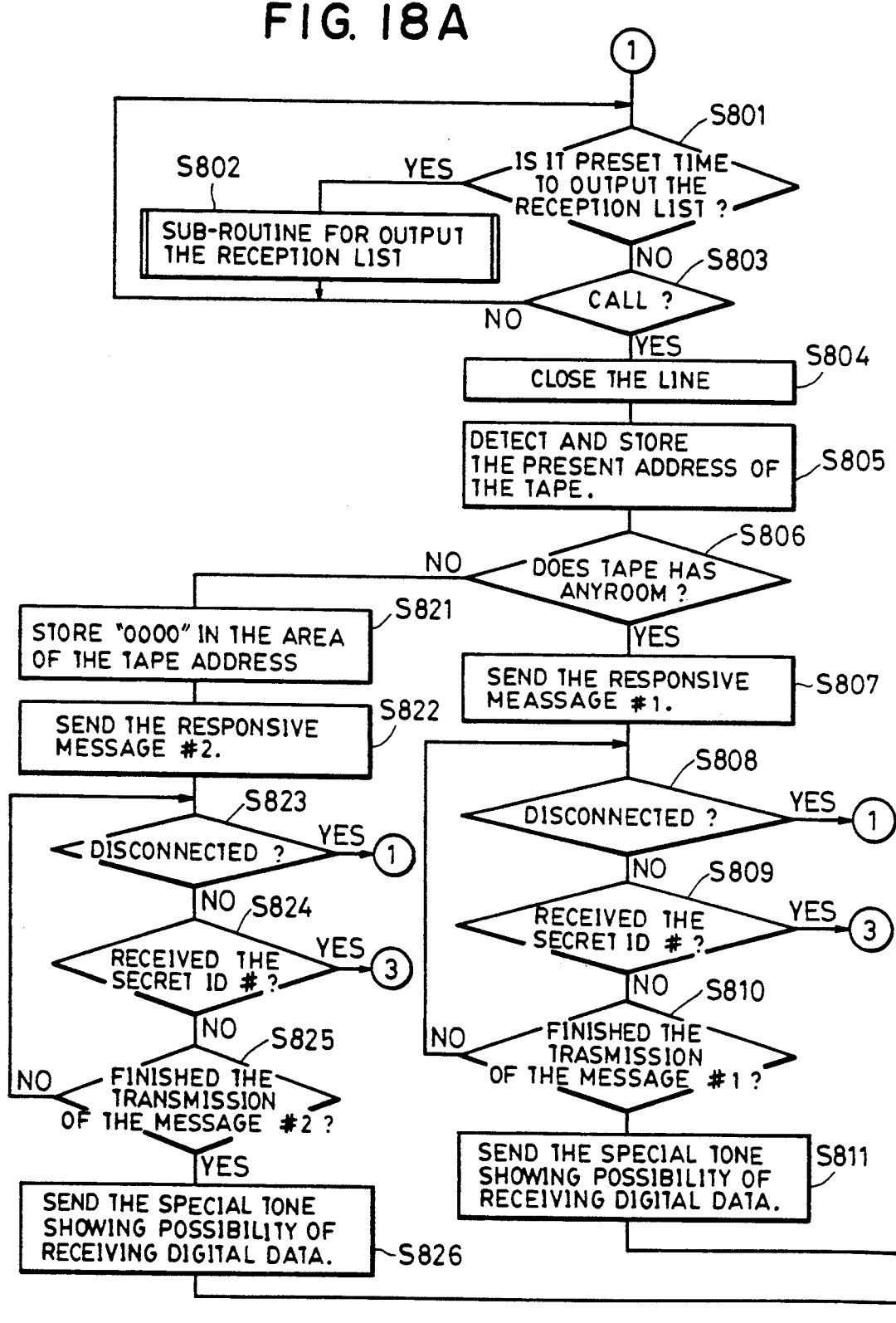

If the called station is set in an answering telephone mode, the main controller 1 operates the procedures shown in FIG. 18 through FIG. 20.

When the main controller 1 detects a predetermined time by monitoring the clock 15, the main controller 1 outputs a list reception (S802). When the main controller 1 confirms a call (S803), the main controller 1 causes the NCU16 to close the communication line (S804) and causes the rotation detector 6 to detect the present address of the magnetic tape, and the memory 14 stores that address (S805).

The main controller 1 sends a responsive message (#1) showing a prompt for transmission of a voice message to the calling station when the magnetic tape has room for recording (S807). When the magnetic tape has no room for recording, the main controller 1 sends to the calling station another responsive message (#2) showing that recording a voice message is currently not possible (S822).

After playing back the responsive message # (S810), the main controller sends a special tone to the communication line (S811), and starts recording the voice message (S812). This special tone is used for telling the calling side operator that the recording of his or her voice will start after this special tone. But, in this embodiment, in order to inform the calling station that the called station is a facsimile apparatus having the answering telephone function, a special frequency tone or a signal specially modified for this purpose is sent as the special tone. If the calling station is also such a facsimile apparatus, when the main controller 1 of the calling station detects the special tone from the called station the main controller 1 causes the display 17 to display an indication that the called station can receive digital data, e.g., the identification code.

At the calling station, after the voice message is sent for an answering telephone, the operator does not put the handset down, but actuates the keys of the operation unit 13, e.g., |#″| |3| or |#| |3| |0| through |#″| |3| |9|. This signal means "STOP" as shown in FIG. 13. The main controller 1 of the called station, after receiving the signal |#| |3| (S816), stops the cassette tape driver of the voice recording part 4 (S815). If the magnetic tape of the called station does not have any room for recording the voice message, at the calling station the operator need not operate |#| |3|. If the main controller 1 of the calling station confirms the function of the called station, the main controller 1 of the calling station changes the mode to DTMF transmission mode.

Further, if the operator at the calling station, after the recording of the voice message, does not operate |#| |3| but puts the handset down (S813), the main controller 1 automatically sends the signal |#| |3| without disconnecting the communication line, on detection of the handset being put down, i.e., on-hook condition (S817 through S820).

After the actuation of the # 3 keys, the operator of the calling station selects the number of the operator name from among #0–#7 preset, and the number of the fixed message from among #0–#7 preset, by key operation of the operation unit 13.

After the main controller of the calling station detects that the operator of the calling station has put the handset down, the main controller 1 sends the telephone number, the identification code, the selected operator name, and the selected fixed message to the called station as described above. After detection of reception without errors by the called station, the main controller 1 disconnects the communication line (S1). At the called station, the main controller 1 causes the memory 14 to store the address of the magnetic tape at the time of generation of the prescribed special tone, by using the rotation amount detector 6 (S805).

If the calling station disconnects the line without sending the digital data, at the called station the main controller 1 stops the cassette-tape driver 5, and makes the columns for the telephone number and the identification code of the calling station, which should be received, blank (S817 and S818). The main controller 1 also makes the columns for the operator name and the fixed message blank, because they have not been received, and causes the memory 14 to store the top address of the magnetic tape.

As described above, the called station records the voice message to the magnetic tape, and after the detection of the signal |#| |3| from the calling station, the called station stops the cassette-tape recorder (S815).

Then, the called station prepares reception of the digital data. The digital data has been received as described above referring to FIG. 13. After the digital data is received correctly, the called station sends a DTMF signal showing confirmation of the reception of the digital data by the calling station and disconnects the line (S1). The called station stores the received digital data with the time of reception, the process time, and the address of the magnetic tape on which the voice message is recorded, all together in one block (S4).

Thus, every time the station is called, the called station records the voice message on the magnetic tape and receives and stores the digital data corresponding to the voice message.

If the voice message cannot be recorded on the magnetic tape and the calling station disconnects the line before the calling station receives the special tone indicating starting of the recording of a voice message from the called station (S808 and S823), the called station does not record anything at all. But if the voice message cannot be recorded because of the lack of the room on the magnetic tape, the called station stores a special address, e.g., "0000" instead of the starting address (S821, S2, S10 and S11).

It should be noted that the digital data can be printed out with a format as described later, just after the reception of the data, which depends on a selected mode.

Further, the main controller 1 causes the display 17 to display that there is received digital data in the memory 14, when there is at least one piece of such data present therein. For the operator, this is helpful because if there is no digital data, the operator need not order a print out.

Print Out the Reception List

Figure 23:
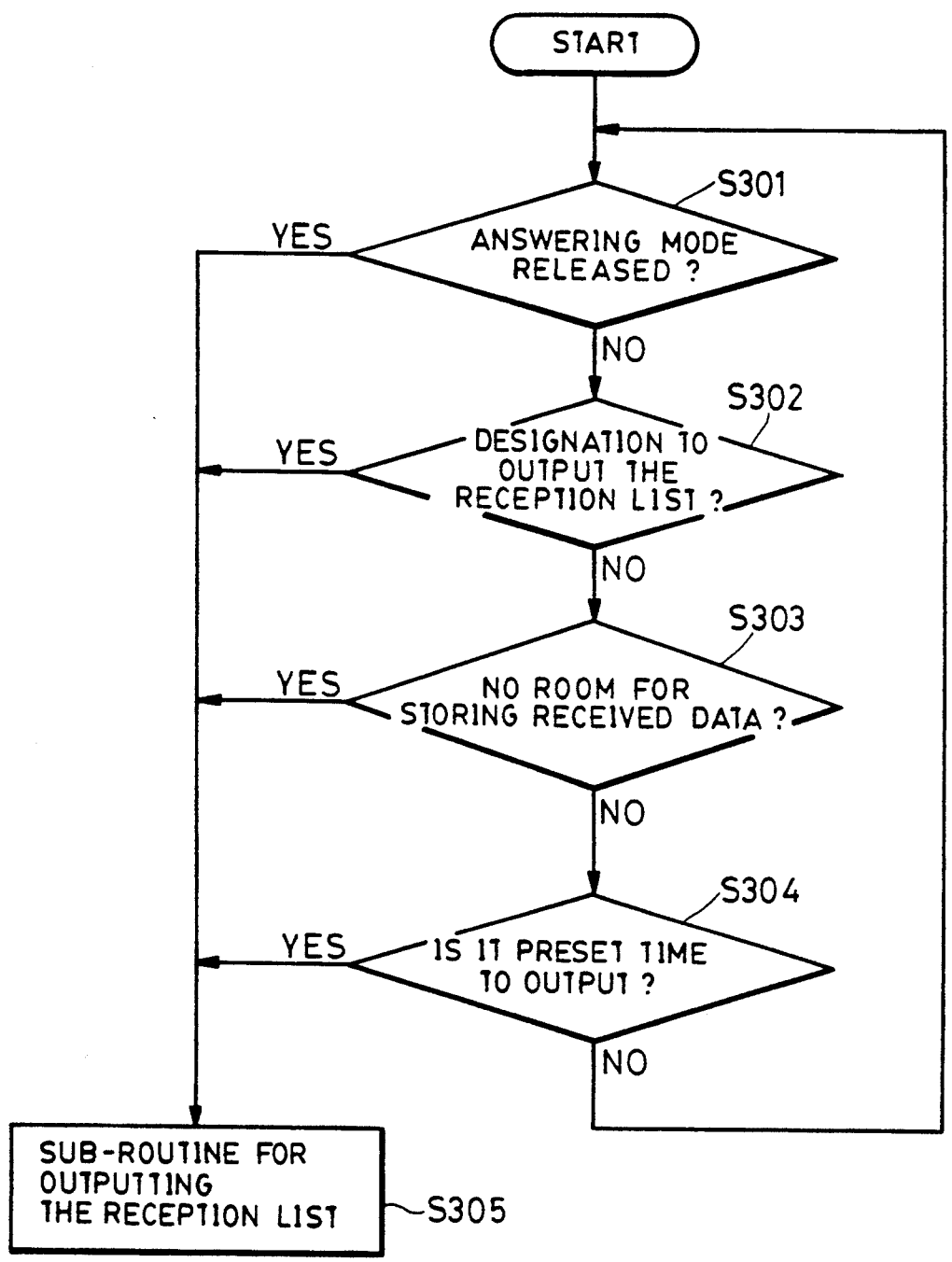

The reception list is printed out as follows, referring to FIG. 23.

The main controller 1 causes the image recording part 11 to print out the reception list with a format shown below (S305), when the answering telephone mode is cancelled (S301), or when the main controller 1 detects the order for printing out the digital data operated with the operation unit 13 (S302):

```
[DATE]  [TIME]  [Telephone Number]
[Identification Code]   [Name of Operator] "called,
       and         said         '[Fixed message]'"
```

If there is no name of operator, "[name of operator] called, and said" is omitted. As well, if there is no fixed message, "and said [fixed message]" is omitted. And if the telephone number and the identification code are not there, these columns are made blank. If a voice message corresponding to the data is recorded on the magnetic tape, the format also includes the printed message "Address of the magnetic tape is 'XXXX'."

If the voice message has not been recorded because of the lack of room on the magnetic tape, the format also has the printed message "The voice message could not be recorded."

After all the data is printed out, the main controller 1 reads out the present time from the clock 15 and causes the image recording part 11 to print the present time on the thermal paper. An example of the reception list is shown in FIG. 14.

If the telephone number, the identification code, operator name, fixed message and the starting address are not in the memory 14 at all, the main controller 1 does not let the image recording part 11 operate.

Further, the main controller 1 can automatically cause the image recording part 11 to print out the reception list when the area in the memory 16 storing such digital data is filled up, when the main controller 1 detects that the area contains a predetermined number of groups of digital data (S303), or when the main controller 1 detects that the clock 15 shows a predetermined time for printing out an operation.

The digital data stored in the memory 14 can be deleted after being printed out, or when the operator plays back the voice message and the address of the digital data coincides with the address of the magnetic tape input from the operation unit 13.

Figure 17:
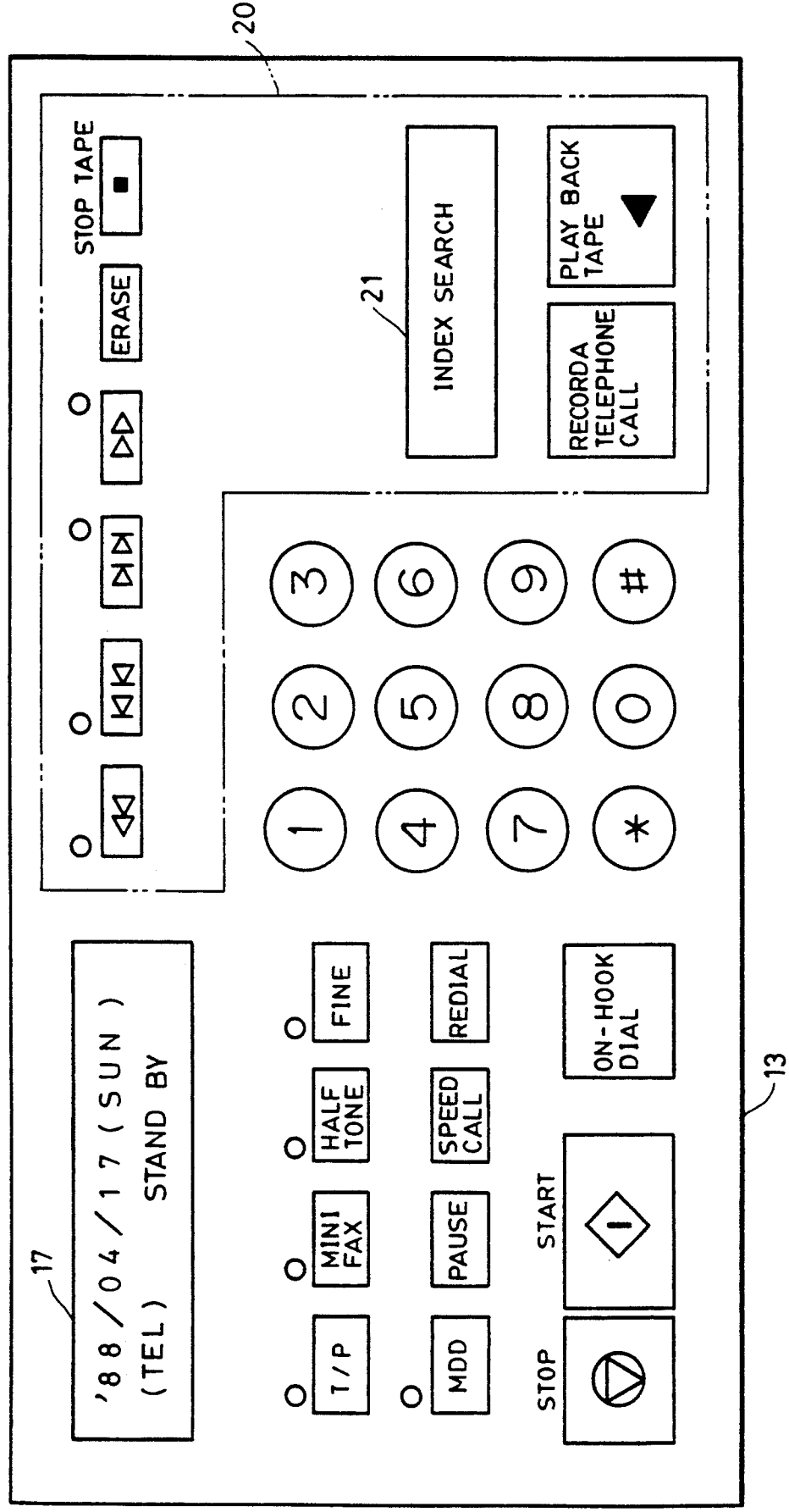
FIG. 17 is an overview of an operation unit.

The operator of the apparatus, first of all, reviews the reception list shown in FIG. 14, and then the operator checks the items listed in what he or she feels is the order of importance. If data shows that there are some recorded voice messages, the operator inputs the starting address of the magnetic tape shown in the list of FIG. 14, via the operation unit 13. For example, the operation unit 13 is structured as shown in FIG. 17. The operator, first of all, pushes an index search key 21 in a block 20 relating to the voice-recording part 4, and then the operator inputs the four-digit starting address (Index Number). The main controller 1 drives the cassette-tape driver 5 in the fast feeding mode so that the present address of the magnetic tape coincides with the starting address input by the operator, which it determines by comparing the addresses. If the addresses coincide, the cassette-tape driver 5 stops the fast feeding, and starts the playing back mode to play back the voice message recorded there.

If the operator does not want another person to be able to hear the contents of the voice message, the voice message is controlled by a secret identification number. In such a case, the operator needs, the secret identification number to output the list as shown in FIG. 14. In other words, the main controller 1 outputs the reception list only upon detecting the input of the secret identification number.

Further, if the operator wants to keep some of the voice messages or of the reception list secret, when the operator puts the apparatus in a delete mode and inputs reception number at the left end of the list shown in FIG. 14. The digital data block corresponding to the input reception number is deleted, the digital data is rearranged in the data area in the way known as "garbage correction", and simultaneously the voice message corresponding to the data block is deleted. It can be arranged that the reception list is output at a predetermined time every day, which is very convenient because the operator can monitor the state of reception every day (S304). In other words, the main controller 1 monitors the clock 15, and initiates the output routine when the present time coincides with the predetermined time.

Simple Communication by the DTMF Signals

The apparatus of this embodiment has the function to send and to receive the DTMF signal, so that if the calling station at least has the function to send the DTMF signal like a tone dialer telephone, the calling station can send the message. In such a case, the format of the message will be as shown below:

TX    STX    Message    ETX

This is expressed with the DTMF signal as shown below:

| TX | STX | Message | ETX |
|---|---|---|---|
| "#44" | "002" | "------" | "003" |

The called station outputs the message right away when it receives the message in such a format.

A simple communication by the DTMF signals is explained as follows referring to FIG. 21.

The main controller 1 of the called station carries out the sequence of FIG. 21 from step S101, after receiving the secret identification number in step S809 or S824.

The main controller 1 compares the secret identification number received with a registered secret identification number registered in the memory 14 (S101). When the secret numbers coincide with each other (S102), the main controller 1 causes the cassette-tape driver 5 to rewind the magnetic tape to the starting end, and the main controller 1 causes the cassette-tape driver 5 to play back the recorded voice messages and sends these messages (S103). If the numbers do not coincide in step S102, the main controller 1 compares the received identification number with known senders' identification numbers (S104). The senders' identification numbers are set for senders respectively with corresponding senders' names in the apparatus as shown in FIG. 15.

This data is registered in the memory 14 by the operator by the key operation of the operation panel 13. After the called station responds with the voice message in step S807 or S822, the sender may input the sender's own identification number, e.g.,

[#] [#] [8] [8] [2] [3] [#] [#]

by the ten-key pad of the calling telephone. The main controller 1 of the called station checks whether the received identification code coincides with one of the registered senders' identification numbers or not. If so, the main controller 1 informs the sender at the calling station of the coincidence (S108), specifies the name of the sender (S109) and preserves the senders name in the memory 14 (S110).

The memory 14 has another area storing fixed messages shown in FIG. 16, and the senders registered in FIG. 15 know the numbers #0 through #7 and the contents of the messages corresponding to the numbers.

When the sender is informed of the coincidence by a special tone or synthesized voice message from the called station (e.g., the identification number of Mr. H. Matsumoto is confirmed), the sender sends a format showing selection of more than one fixed message, as follows:

[TX] [#] [2] [#] [6]

This shows that two messages, #2 and #6, are selected. With the DTMF signals:

[#] [6] [6] [#] [2] [#] [6]

The main controller 1 of the called station monitors the line if the DTMF signal is sent (S111). If the sent DTMF signals are valid (S113 through S115), the main controller 1 preserves the received data in the memory 14 (S117), and informs the operator of the validity of the received data (S118). If not, the main controller 1 informs the operator of the invalidity of the received data. "Validity" here means that the received data is defined as the DTMF signals for designating more than one fixed message shown in FIG. 16 (S115), or that the received data is a DTMF signal itself (S114).

After detecting disconnection of the line following the reception of the DTMF signals (S120), if the received data is valid (S121), the main controller 1 reads out the present time from the clock 15 (S122), and causes the image recording part 11 to print out the present time, the sender's name and the received data (S123) as shown below:

```
"'88/04/15    14:32    Message from Mr. H. Matsumoto
                      I will go to Ami Factory.
                      I will go back by 18:00."
```

As described above, this apparatus can be used as a simple memorizing apparatus or a remote-controlled message board.

Modification of the First Embodiment

Figure 24:
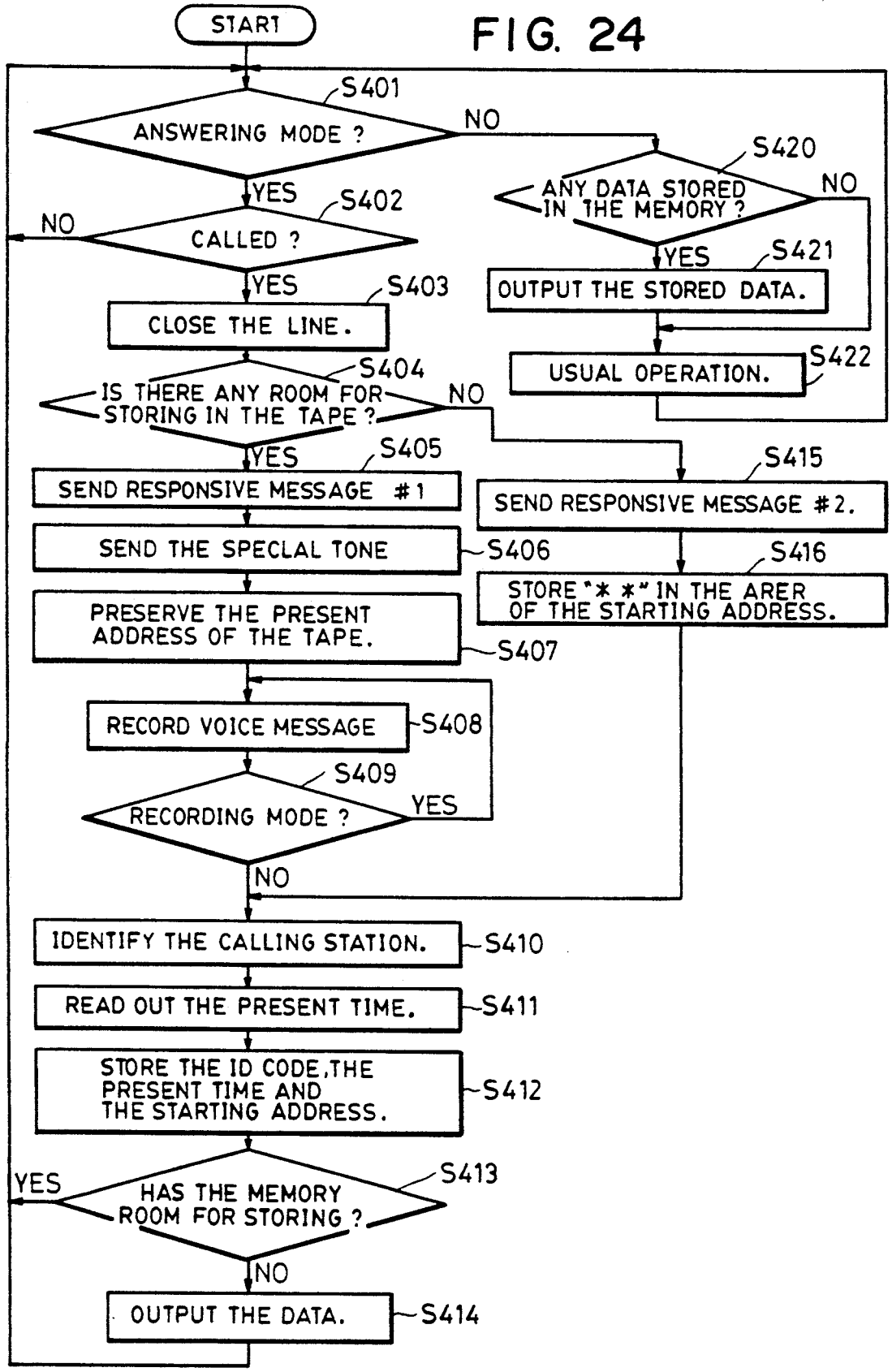
FIG. 24 is a flowchart showing a control program of a modification of the embodiment of FIG. 1.

In this modified embodiment, the structure is the same as in the first embodiment, shown in FIG. 1. The control sequence of the modified embodiment is shown in FIG. 24.

When the main controller 1 detects that an answering telephone mode has been set by the operation unit 13 (S401), the main controller 1 stands by, waiting a call from other stations (S402). When the main controller 1 detects a call, the main controller 1 closes the communication line. If the magnetic tape has room for recording information (S606), the main controller 1 sends a responsive message #1 to the sender to prompt the sending of his voice message (S405), and sends to the sender a special tone which indicates that the called station is the facsimile apparatus of this embodiment (S406). The main controller stores the present address of the magnetic tape in the memory 14 (S407), the present address being used for the starting position to be played back. And the main controller 1 lets the cassette-tape driver 5 record the sender's voice message (S409).

After the sender at the calling station finishes sending the voice message, the sender pushes the key # at the operation panel and puts the handset down (on-hook condition) if urgent, but if not urgent, the sender puts the handset down (on-hook) without pushing the key #. The main controller 1 of the calling station reads out the identification information including its telephone number and its identification code from the memory 14, converts the identification information to tone signals like DTMF signals, and sends the tone signals to the line.

The main controller 1 of the called station detects the DTMF signal of #, and determines this message is urgent. The main controller 1 receives the identification information and decodes the DTMF signals (S410). Then, the main controller 1 reads out the present time from the clock 15 (S411), and stores the identification information, the present time, the starting address of the magnetic tape, and the information showing whether the matter is urgent or not into the memory 14.

Then the main controller 1 checks if the memory 14 has enough space to store information (S413). If the memory has too little space, the main controller 1 lets the image recording part 11 print out the received information data on the thermal paper (S414). At that time, after the data is recorded, the main controller 1 reads out present time from the clock 15, and lets the image recording part 11 print the present time following the data.

In step S404, the main controller 1, if it determines the magnetic tape does not have any room to store the information, sends a responsive message #2 to the sender to let the sender know that (S415). The main controller 1 of the called station registers "* *" at the column of the starting address of the magnetic tape to make sure that the voice message cannot be recorded (S416). Then the main controller advances to step S410 without recording. Thus, the sender is able to let the called station register the identification information even if the magnetic tape cannot store the voice message.

When the main controller 1 detects that the answering telephone mode is released in step S401, the main controller 1 causes the image recording part 11 to print out the information data if any data to be printed out is in the memory 14 in steps S420 and S421 as well as in step S414.

The apparatus of this embodiment operates as well as a normal telephone (S422).

Therefore, after seeing a list of messages output from the image recording part 11, the operator can select voice messages from more urgent messages if necessary, or in accordance with the name of the sender, and can input the starting address from the operation unit 13. The main controller 11 lets the cassette-tape driver 5 rewind to the position designated by the input starting address, and play back the voice message.

As described above, in accordance with these embodiments, by outputting the identification information of the calling station and the starting address of the recorded voice message, the apparatus lets the operator know the calling station which records the voice message and the starting address of the recorded voice message. Therefore, the operator can let the cassette-tape driver play back messages selected by the operator in accordance with priority for the operator, and the cassette-tape driver can play back selected messages from their starting addresses.

Second Embodiment

Figure 25:
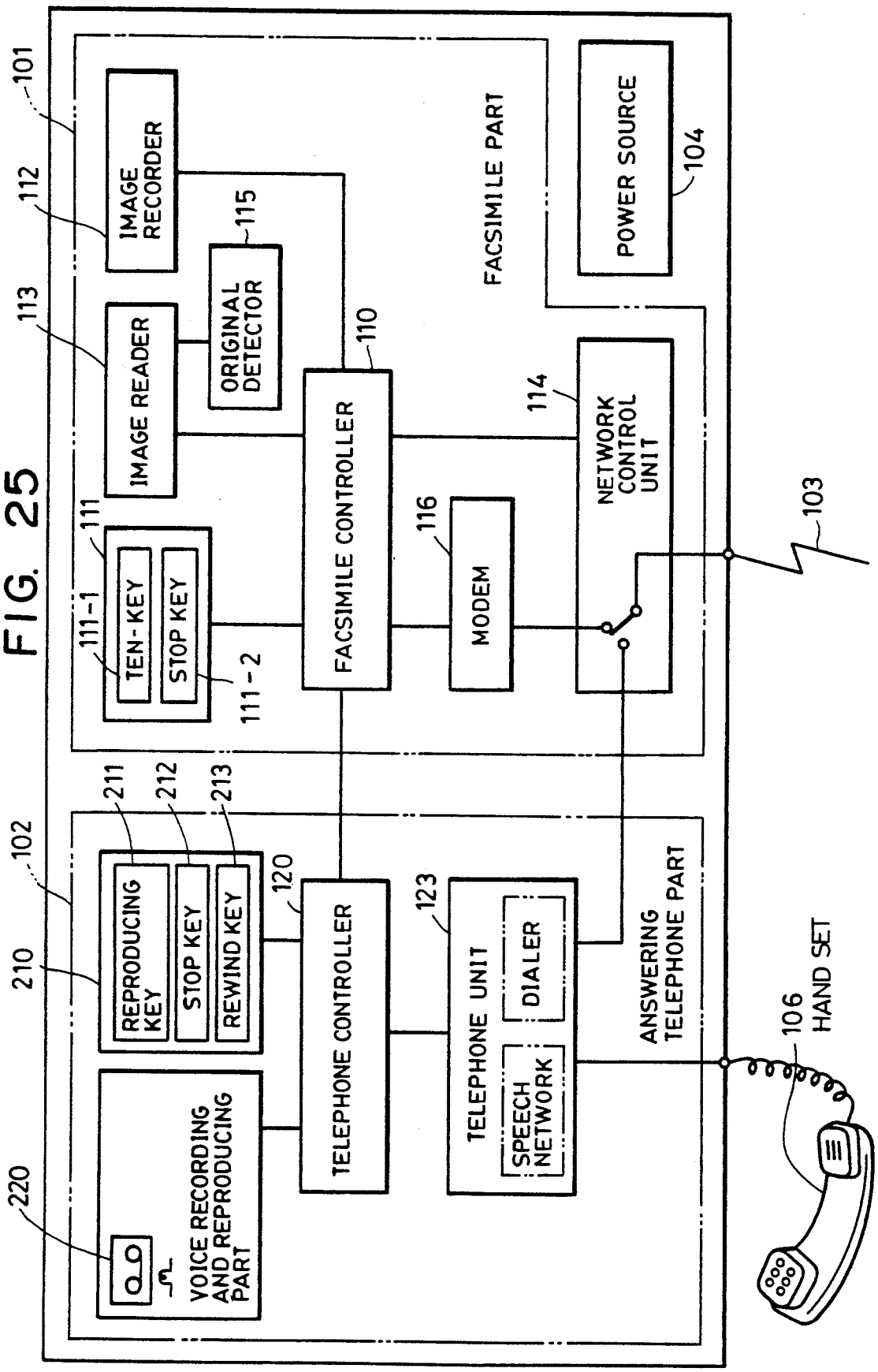
FIG. 25 is a block diagram showing a structure of a second embodiment.
Figure 26:
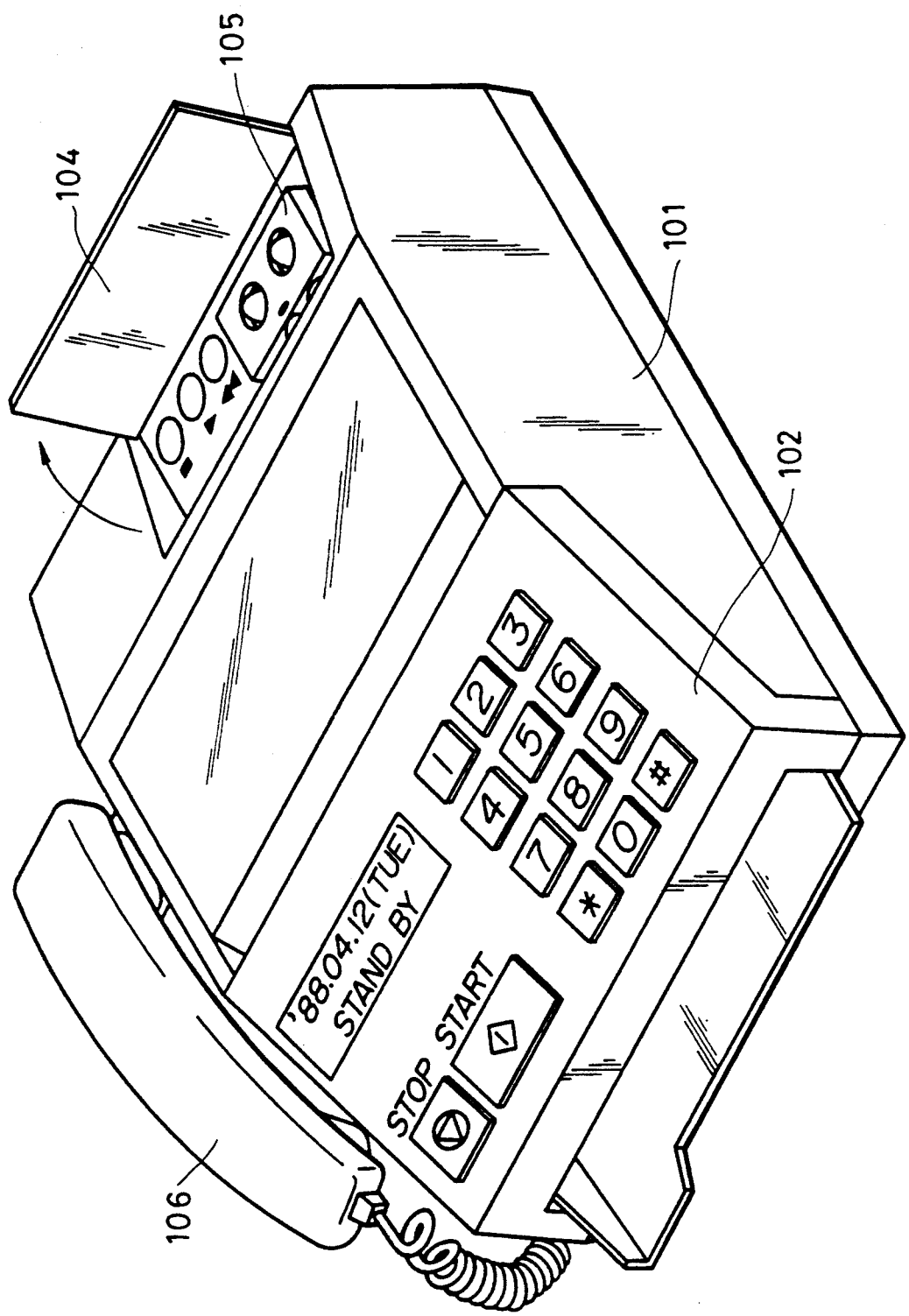
FIG. 26 is a perspective view of the second embodiment.

FIG. 25 shows a diagram of a second embodiment of the present invention and FIG. 26 shows a perspective view of the second embodiment.

Referring to these two FIGS. 25 and 26, the facsimile apparatus having the answering telephone provides a facsimile part 101, an answering telephone part 102, a facsimile controller 110 for controlling the facsimile part 101, and a telephone controller 120 for controlling the answering telephone part 102. A voice recording and reproducing part 220 are also provided for recording voice signals from the communication line 103, and for reproducing the recorded voice signals.

The facsimile controller 110 controls the telephone controller 120, an image recorder 112 for recording received images, an image reader 113 for reading original documents, and a network control unit (NCU) 14 for controlling connection of the line 103 in accordance with signals from an operation part 111, from the communication line 103 via a modem and from an original detector for detecting an original sheet.

The telephone controller 120 controls the voice recording and the reproducing part 220 and a telephone unit 123 having a speech network and a dialer for generating a dial signal in accordance with signals from the telephone operation unit 210 and from the facsimile controller 110.

Operation of the facsimile controller 110 will be explained as follows, referring to FIG. 27.

The facsimile controller 110, in steps S501 through S503, checks whether there is an input from ten-keys 111-1 and a stop key 111-2 of the facsimile operation panel 111 or from the communication line 103 or not and whether the facsimile part 101 is using the line 103 or not.

In step S501, the facsimile controller 110, upon detecting depression of the ten-key pad 111-1, checks to see if there is an original sheet to be transmitted by the original detector 115 in step S506. If there is an original sheet and the line 103 is not busy (S500), the facsimile controller 110 controls the image reader 113, the NCU 114 and the modem 116 for modulating and demodulating signals to transmit image signals of the original to a destination station designated by the ten key pad 111-1 (S505).

On the other hand, if there is no original sheet, the facsimile controller 110 controls the NCU 114 to connect the line 103 to the answering telephone part 102, and outputs an order to call and a signal showing another telephone number of the destination station to call to the telephone controller 120 (S506).

In step S502, when the facsimile controller 110 detects the depression of the stop key 111-2, the facsimile controller 110 stops the transmission of the original image operated in step S505 (S507).

When the facsimile controller 110 receives a signal from the line 103, the facsimile controller discriminates whether the received signal is a signal for facsimile communication (S508). If the received signal is one for facsimile communication, the facsimile controller 110 controls the NCU 114, the modem 116 and the image recorder 112 to convert the received signal to an image signal in order to record the image on recording paper.

Otherwise, the facsimile controller 110 controls the NCU 114 to connect the line 103 to the telephone unit 123 and to ring a bell (not shown) informing an operator of the receiving of a call (S510).

At this time, if the line 103 is connected to the telephone unit 123 when the answering telephone part 102 is in an answering telephone mode, the telephone controller 120 causes the voice recording and reproducing part 220 to record a voice message from the line 103.

The telephone controller 120 controls as follows.

Figure 27:
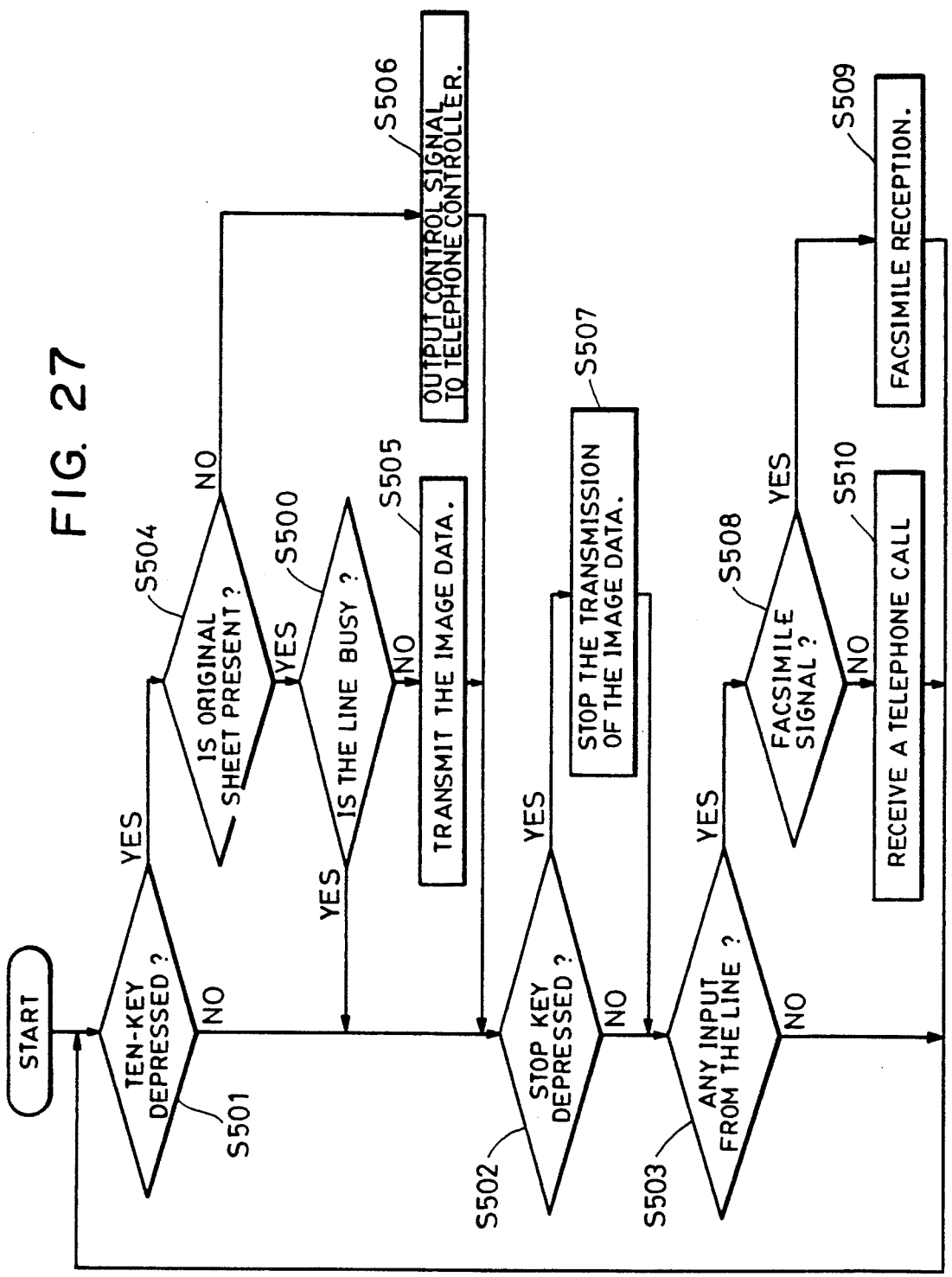
FIG. 27 is a flowchart showing a control program of a facsimile controller in the second embodiment.

Referring to the flow chart of FIG. 27, the telephone controller 120, in steps S601 through S604, checks for the depression of a reproducing key 211, a stop key 212 and a rewinding key 213 and checks if a control signal has been input from the facsimile controller 110.

When the depression of the reproducing key 211 is detected in step S601, the telephone controller 120 outputs a reproducing start signal to the voice recording and reproducing part 220 to reproduce the voice message recorded in it (S605).

When the depression of the stop key 212 is detected in step S602, the telephone controller 120 outputs a signal to stop the reproduction of the voice message, and causes the voice recording and reproducing part 220 to stop reproducing the voice message (S606).

When the depression of the rewinding key 213 is detected in step S603, the telephone controller 120 outputs a rewinding signal to the part 220, and causes the voice recording and reproducing part to rewind a magnetic tape where the voice message is recorded (S607).

When the control signal is input from the facsimile controller 110 in step 604, the telephone controller 120 causes the telephone unit 123 to call and to dial with a number input from the facsimile controller 110 via the line 103 (S608).

Thus, in this embodiment, the telephone controller 120 discriminates the depression of operation keys of the telephone operation unit 210 for controlling the voice recording and reproducing part 220 in steps S601 through S603, and in response to the discrimination the telephone controller 120 controls the voice recording and the reproducing part 220 in steps S605 through S607.

The facsimile controller 110 controls the transmission and reception of facsimile image signal. Therefore, the control of the facsimile communication and the control of the voice recording and reproducing part 220 are independent. As a result, it is not necessary to control the voice recording and reproducing part 220 in an interrupting routine during the control of facsimile communication. Thereby, the control program is simplified, it becomes easier to prevent mistakes in the control program, which increases the reliability of the total system.

In this embodiment, the ten key pad 111-1 is used for designating destination stations for both facsimile communication and voice communication, which are distinguished by the detection of an original sheet by the original detector 115. In other words, if the original detector 115 does not detect an original sheet and the facsimile controller 110 detects the depression of a key of the ten key pad 111-1 in step S504 of FIG. 27, the facsimile controller 110 causes the telephone controller 120 to call from the telephone unit 123. Thus, the facsimile controller 110 also controls whether the communication is executed by the facsimile part 101 or by the answering telephone part 102.

Third Embodiment

Figure 29:
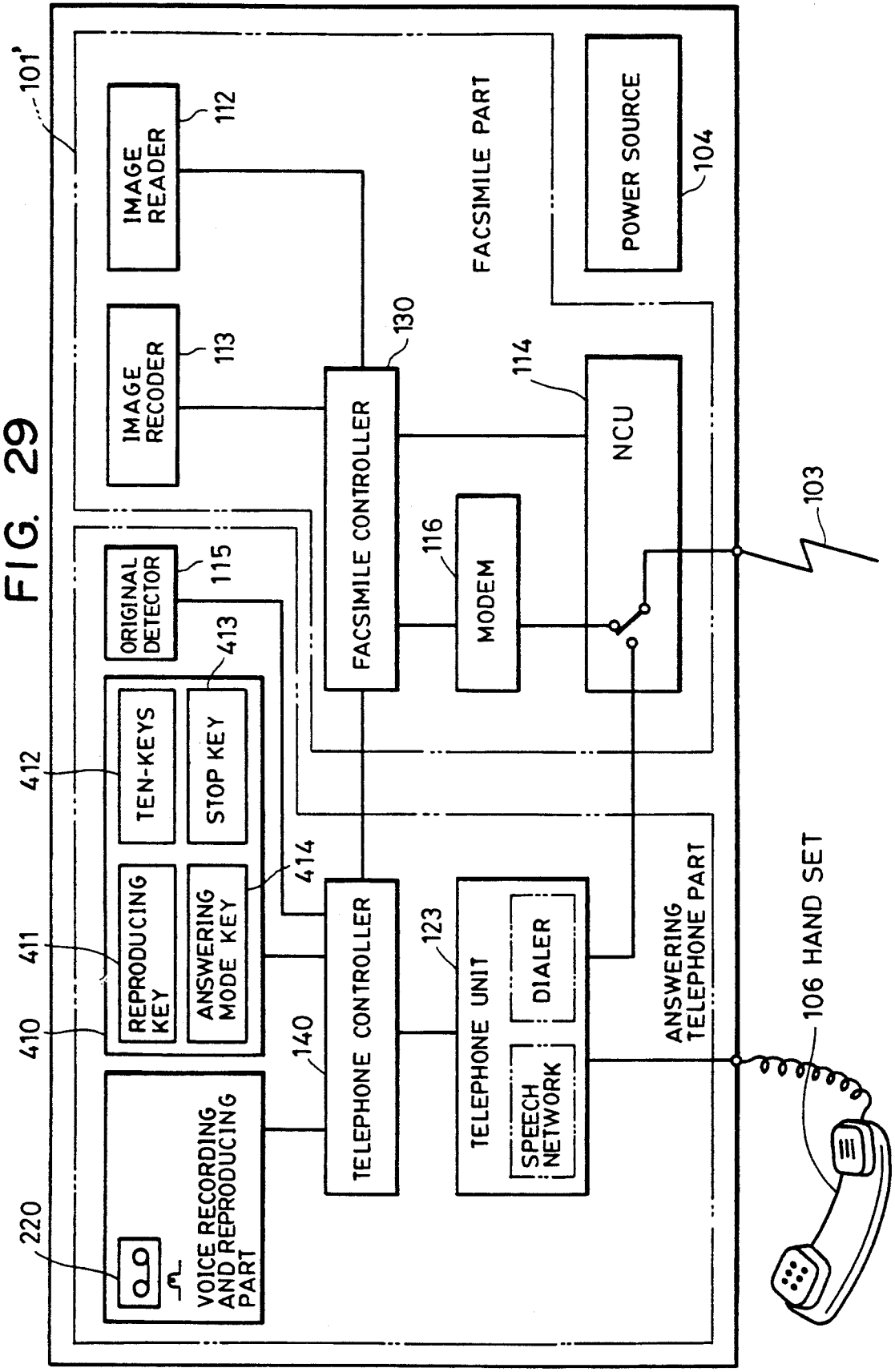
FIG. 29 is a block diagram of a third embodiment.

FIG. 29 is a block diagram of the third embodiment.

A facsimile apparatus having an answering telephone of the third embodiment provides a facsimile controller 130, a telephone controller 140 and an operation unit 410. Other elements for operating are the same as the elements shown in FIG. 25 and are denoted with the same reference numbers as in FIG. 25.

The facsimile controller 130 controls the image reader 112, the image recorder 113, the NCU 114 and the modem 116, in response to signals from the line 103 and the telephone controller 140, and the facsimile controller 130 informs the telephone controller 140 of the business of the line 103 during the facsimile communication.

On the other hand, the telephone controller 140 controls the voice recording and reproducing part 220, the telephone unit 123 and the facsimile controller 130 in response to signals from the original detector 115, an operation unit 410 and the facsimile controller 130.

Figure 30:
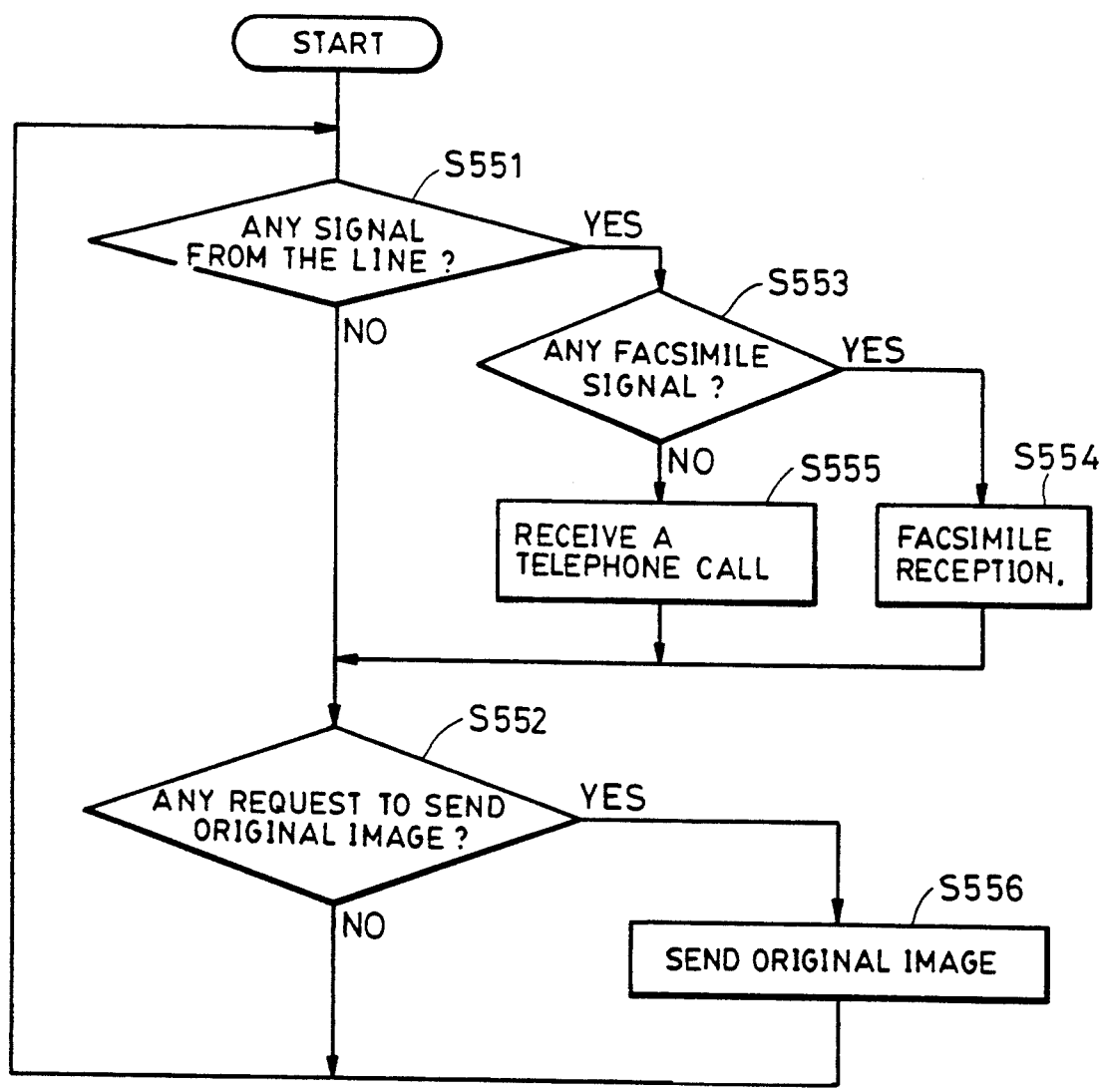
FIG. 30 is a flowchart showing a control program of a facsimile controller in the third embodiment.

Referring to FIG. 30, operation of the facsimile controller 130 is explained as follows.

In steps S551 and S552, the facsimile controller 130 discriminates whether there is an input from the line 103 and whether there is an order from the telephone controller 140. When the input from the line 103 is detected in step S551, the facsimile controller 130 discriminates if the input is a signal for facsimile communication in step S553. If so, the facsimile controller 130 controls the NCU 114, the modem 116 and the image recorder 113 to causes the recorder 113 to print out the image from the line 103 on the recording paper in step S556. During the reception of the facsimile signals, the facsimile controller 130 outputs the busy signal showing that the line 103 is used by the facsimile communication to the telephone controller 140. After the reception of the facsimile signals finishes, the facsimile controller 130 stops outputting the busy signal, and thereby informs the telephone controller 140 that the line 103 is now not busy.

If the input from the line 103 is not the signal for the facsimile communication, the facsimile controller 130 controls the NCU 114 such that the line 103 connects to the telephone unit 123 and that the bell (not shown) rings in step S555. At this time, if the answering mode is set, the telephone controller 140 causes the voice recording and reproducing part 220 to record a voice message.

Figure 31:
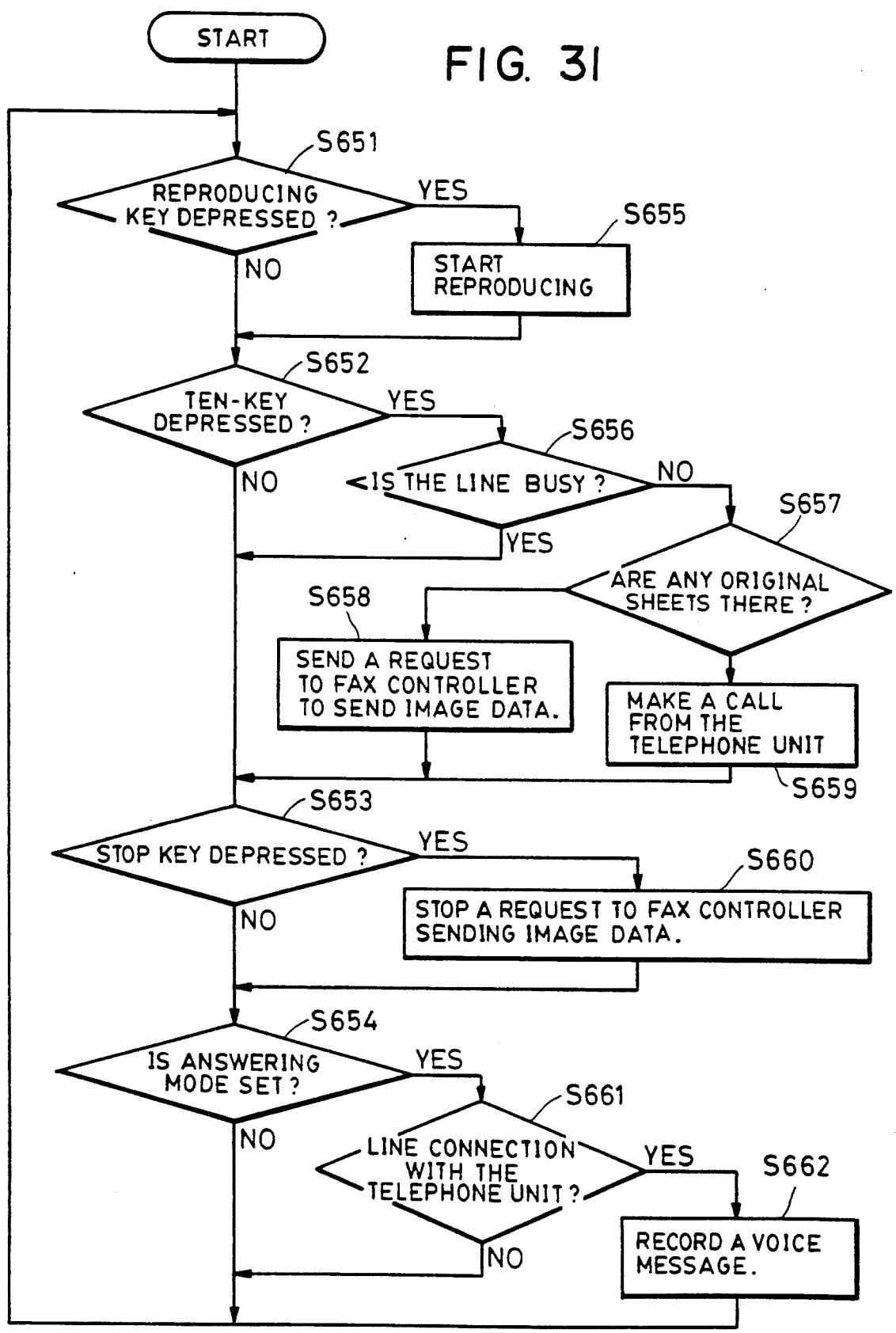
FIG. 31 is a flowchart showing a control program of a telephone controller in the third embodiment.

In step S552, when the facsimile controller 130 receives a transmission order from the telephone controller 140, the facsimile controller controls the image reader 112, the modem 116 and the NCU 114 to transmit the original image signal read by the reader 112 to a destination station designated by the telephone controller 140 with a signal following the transmission order, in step S556. During the transmission of the original image signal, the facsimile controller 130 continues to output the busy signal to the telephone controller 140. On finishing the transmission, the facsimile controller 130 stops outputting the busy signal, and thereby informs the telephone controller 140 that the line 102 is now free. Referring to FIG. 31, operation of the telephone controller 140 is explained as follows.

The telephone controller 140, in steps S651 through S654, checks for the depression of a reproducing key 411, a key of the ten-key pad 412 and a stop key 413, and checks for whether the answering mode is set or not.

When the depression of the reproducing key 411 is detected in step S651, the telephone controller 140 causes the voice recording and reproducing part 220 to play back voice messages recorded therein, in step S655.

When the depression of a key of the ten-key pad 612 is detected in step S652, the telephone controller 140 checks if the facsimile controller 130 is outputting a busy signal showing the line is used by the facsimile communication in step S656. If there is no busy signal, the telephone controller 140 further checks if the original detector 115 detects there is an original sheet to be sent in step S657. If the original detector detects an original sheet, the telephone controller 140 sends the transmission order to the facsimile controller 130 in step S658, and then outputs signal showing the destination station designated with the ten-key pad to the facsimile controller 130. If there is no original sheet, the telephone controller 140 causes the telephone unit 123 to call the destination station designated with the ten-key pad 412.

If the busy signal is output from the facsimile controller 130, then the telephone controller 140 does not accept the key pad operation of the ten-key pad 412.

In step S653, when the depression of the stop key 413 is detected, the telephone controller 140 stops outputting the transmission order to the facsimile controller 130, and causes the facsimile controller 130 to stop reading an original sheet of the reader 112 and to stop transmitting an image signal to the line 103 in step S660.

Further, if the telephone controller 140 detects that the answering mode is set by the operation unit 410, the telephone controller 140 causes the voice recording and reproducing part 220 to record the voice message from the line 103 in step S662 on detection of connection between the line 103 and the telephone unit 123 in step S661.

Thus, in this embodiment, the key operation of the operation unit 410 is monitored by the telephone controller 140, whereas the facsimile communication is controlled by the facsimile controller 130. Therefore, the facsimile controller 130 need not discriminate whether the stop key is depressed or not in the interrupting routine. Thus, the control program of the facsimile controller is simplified, it becomes easier to prevent mistakes in the control program, and the reliability of the total system rises consequently.

The facsimile controller 130 outputs the busy signal during the facsimile communication, and the telephone controller 140 receives the busy signal. During reception of the busy signal the telephone controller 140 ignores the depression of the ten-key pad 412. Therefore, even if the operator depresses a key of the ten-key pad 412 by mistake during the facsimile communication, the telephone controller is prevented from calling.

In this embodiment, the telephone controller 140 monitors the depression of the ten-key pad 412 as described above, and consumption of electricity by the answering telephone part 102' is less than that of the facsimile part 101'. Therefore, even during the power failure the telephone part 102' can operate by using a complimentary power source 104, e.g., a battery without operating the facsimile part 101'. In this case, the NCU 114 is controlled to have connection between the line 103 and the answering telephone part 102' finally.

The telephone controller 140 can be structured to prohibit operation of the answering mode on detection of a power failure, the answering telephone part 102 operating then just as a usual telephone. In this case, the answering telephone part 102 can be operated with electricity supplied from the communication line. Thus, even in the case of power failure, the apparatus of this embodiment can be used for voice communication.

As described above, in accordance with the second and third embodiments, the facsimile communication and the voice recording and reproducing operations are controlled independently. Thereby, without interrupting the control of the facsimile communication, the voice message can be reproduced. Thereby the control programs of both the telephone controller and the facsimile controller are simplified, which increases the reliability of the apparatus.

Further, the telephone number of the destination station is able to be transferred between both the controllers so that one designating means for designating the destination can be used for both facsimile communication and voice communication.

Fourth Embodiment

The fourth embodiment is a combination of the first embodiment and the second embodiment, and the functions of the first embodiment are accomplished using the structures of the second embodiment.

Figure 32:
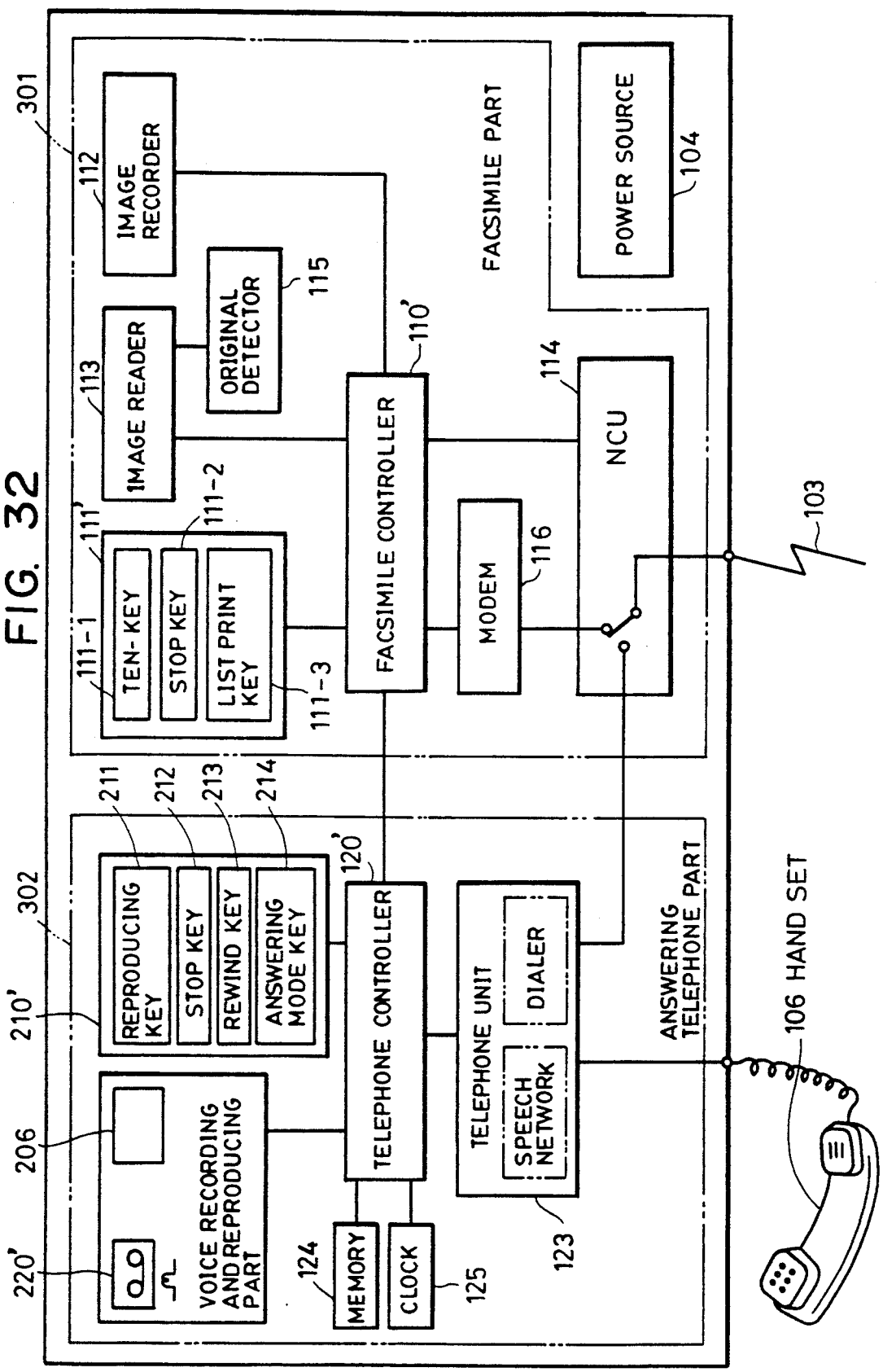
FIG. 32 is a block diagram showing a fourth embodiment.

FIG. 32 is a block diagram showing the structure of the fourth embodiment. In FIG. 32, elements which have the same functions as in FIG. 25 have the same reference numerals as in FIG. 25.

As shown in FIG. 32, a voice recording and reproducing part 220' has a tape amount detector 206 for detecting the address of a magnetic tape. A memory 124 is also provided for storing time information of reception from the clock 125, and a starting address of the magnetic tape where a voice message is recorded. The memory 124 also stores the telephone number, the identification code and the operator's name of the other calling station, and fixed messages when these kinds of information are sent from the other calling station with DTMF signals. The image recorder 112 is structured to be able to print out these kinds of information, e.g., the telephone number, the identification code, the operator's name, the time information of the reception and the starting address of the magnetic tape corresponding to the reception, as well as in the first embodiment.

Further, the telephone operation unit 210' also has an answering mode key 214 for designating the answering mode, and the facsimile operation unit 111' also has a list print key 111-3 for instructing the apparatus to print out the reception list.

Figure 28:
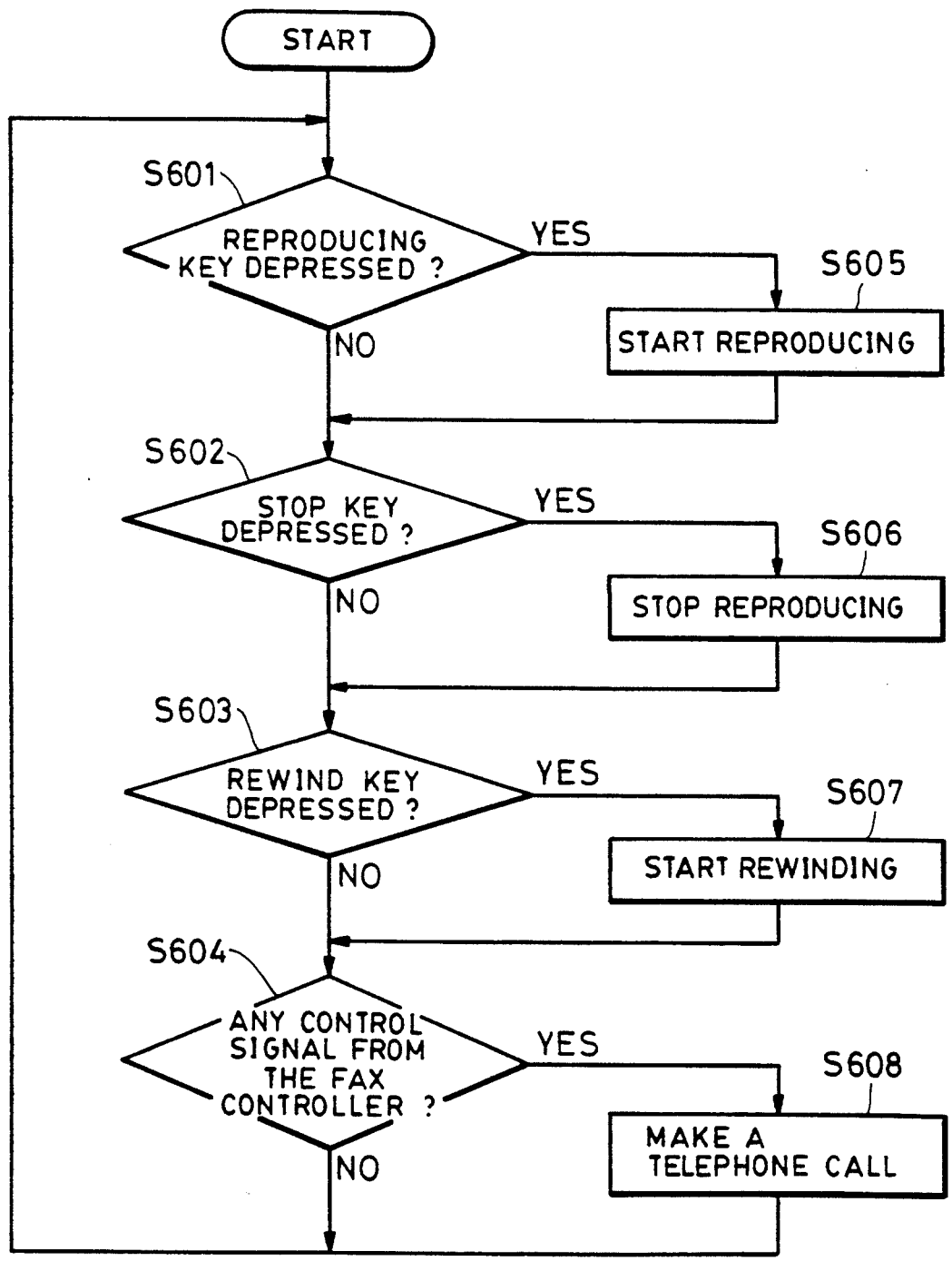
FIG. 28 is a flowchart showing a control program of a telephone controller in the second embodiment.
Figure 33:
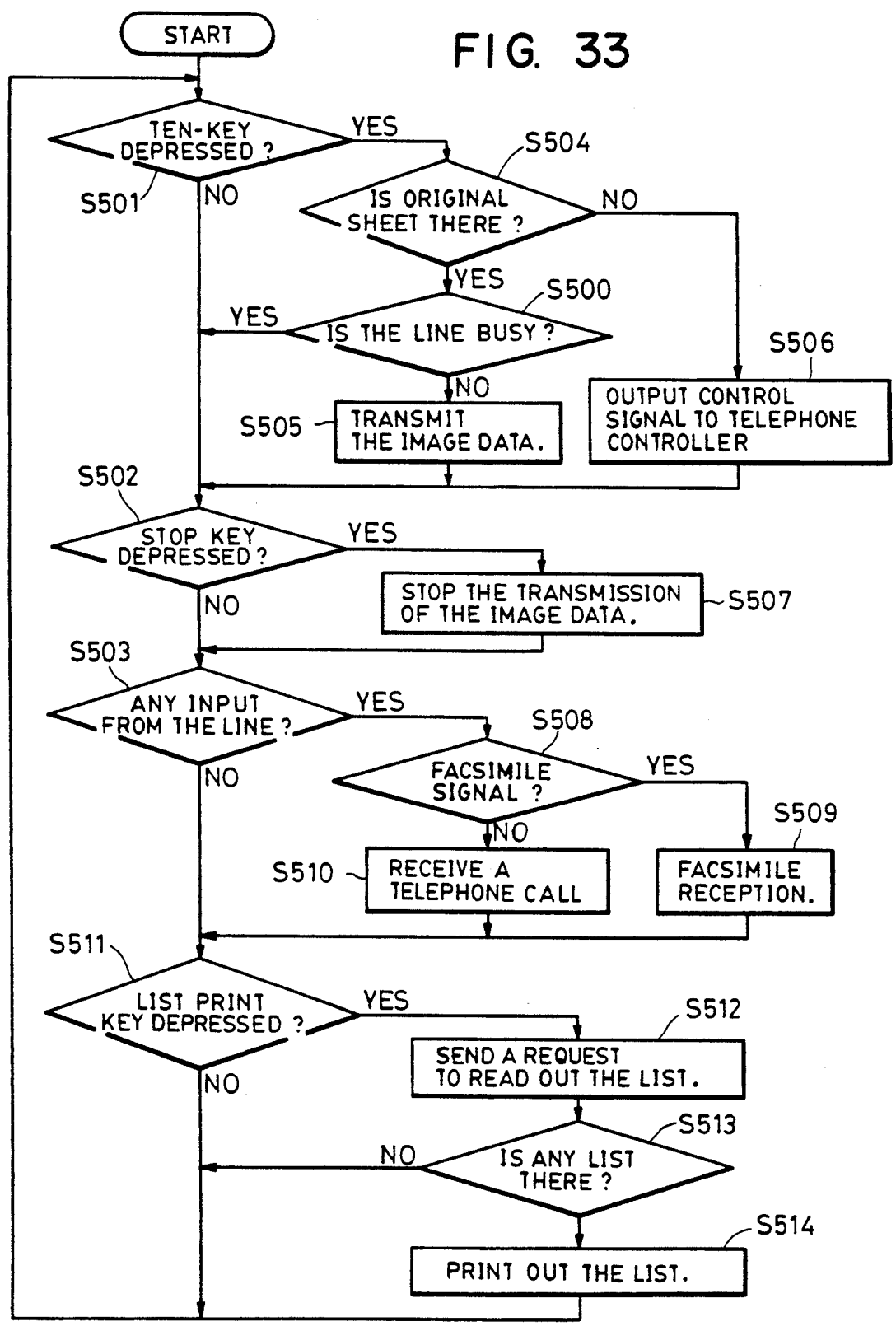
FIG. 33 is a flowchart showing a control program of a facsimile controller in the fourth embodiment.
Figure 34:
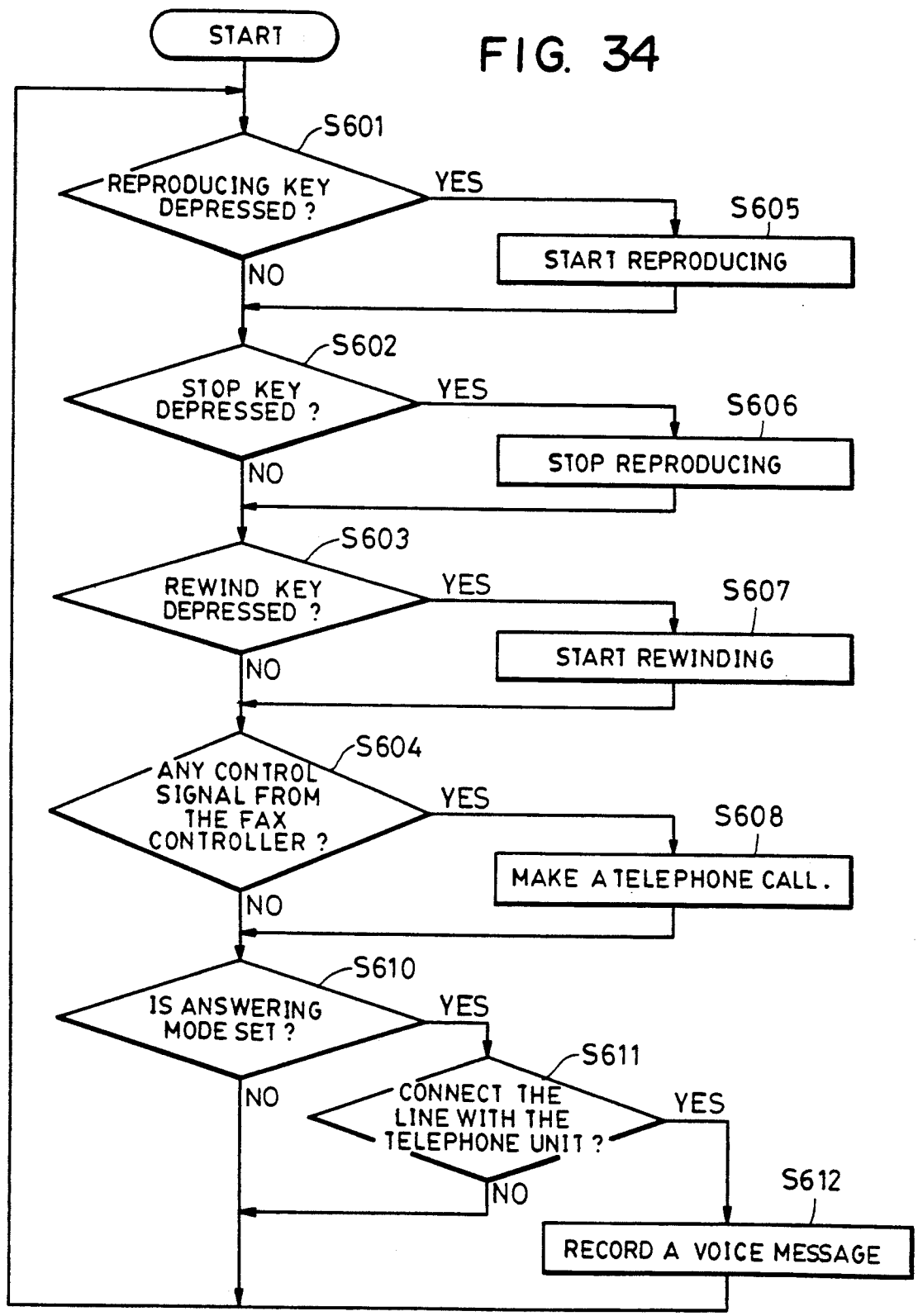
FIG. 34 is a flowchart showing a control program of a telephone controller in the fourth embodiment.

Operations of the facsimile controller 110', and the telephone controller 120' are respectively shown in FIGS. 33 and 34. The same operations as shown in FIGS. 27 and 28 are indicated as the same step number, and their explanations are omitted.

First of all, referring to FIG. 33, the operation of the facsimile controller 110' is explained as follows.

When an operator depresses the list print key 111-3 to print out the reception list and the facsimile controller 110' detects the depression of the key 111-3, in step S511, the facsimile controller 110' requests the telephone controller 120' to output the reception list from the memory 124 in step S512. The telephone controller 120' outputs the reception list, having the above-mentioned kinds of information, to the facsimile controller 110' in response to such a request. After receiving the reception list to be printed out in step S513, the facsimile controller 110' causes the image recorder 112 to print out the list in step S514.

The telephone controller 120' operates as follows.

When the telephone controller 120' detects the answering mode is set in the apparatus by the operation unit 220' in step S610, and the telephone controller 120' detects the line 103 is connected to the telephone unit 123 in step S611, the telephone controller 120' causes the voice recording and reproducing part 220 to record the voice message from the line 103 in step S612.

The voice recording operation of step S612 is concretely explained as follows, referring to FIG. 38.

First of all, the telephone controller 120' reads out present time from the clock 125, and stores that in the memory 124. The telephone controller 120' also receives the starting address of the magnetic tape where the corresponding voice message is recorded, and stores that in the memory 124 in step S671. Then, the telephone controller 120' causes the voice recording and reproducing part 220' to start recording the voice message from the calling station in step S672.

When the telephone controller 120' discriminates the communication line 103 is opened by the calling station, the telephone controller causes the recorder 220' to stop recording the voice message in step S674. If the telephone controller 120' receives the DTMF signals showing the operator's name, the telephone number, the fixed message and/or the identification code of the calling station therefrom (S675), the telephone controller 120' analyzes the received data and stores the analyzed data in the memory 124, as well as in the first embodiment, in step S676.

The stored data in the memory 124 is output as the reception list in step S514 is step S514 of FIG. 33. The format of the reception list is the same as in the first embodiment. If the starting address in the reception list is input from the ten-key pad 111-1 by the operator, the telephone controller 120' causes the voice recording and reproducing part 220' to access the input address and to reproduce automatically the corresponding voice message as in the first embodiment. In this case the starting address is transferred from the facsimile controller 110' to the telephone controller 120'.

As described above, the fourth embodiment has effects of both the first and second embodiments: the ease of making control programs, the ability to determine the relative importance of received voice messages, and the ease of access of the voice message.

Fifth Embodiment

Figure 35:
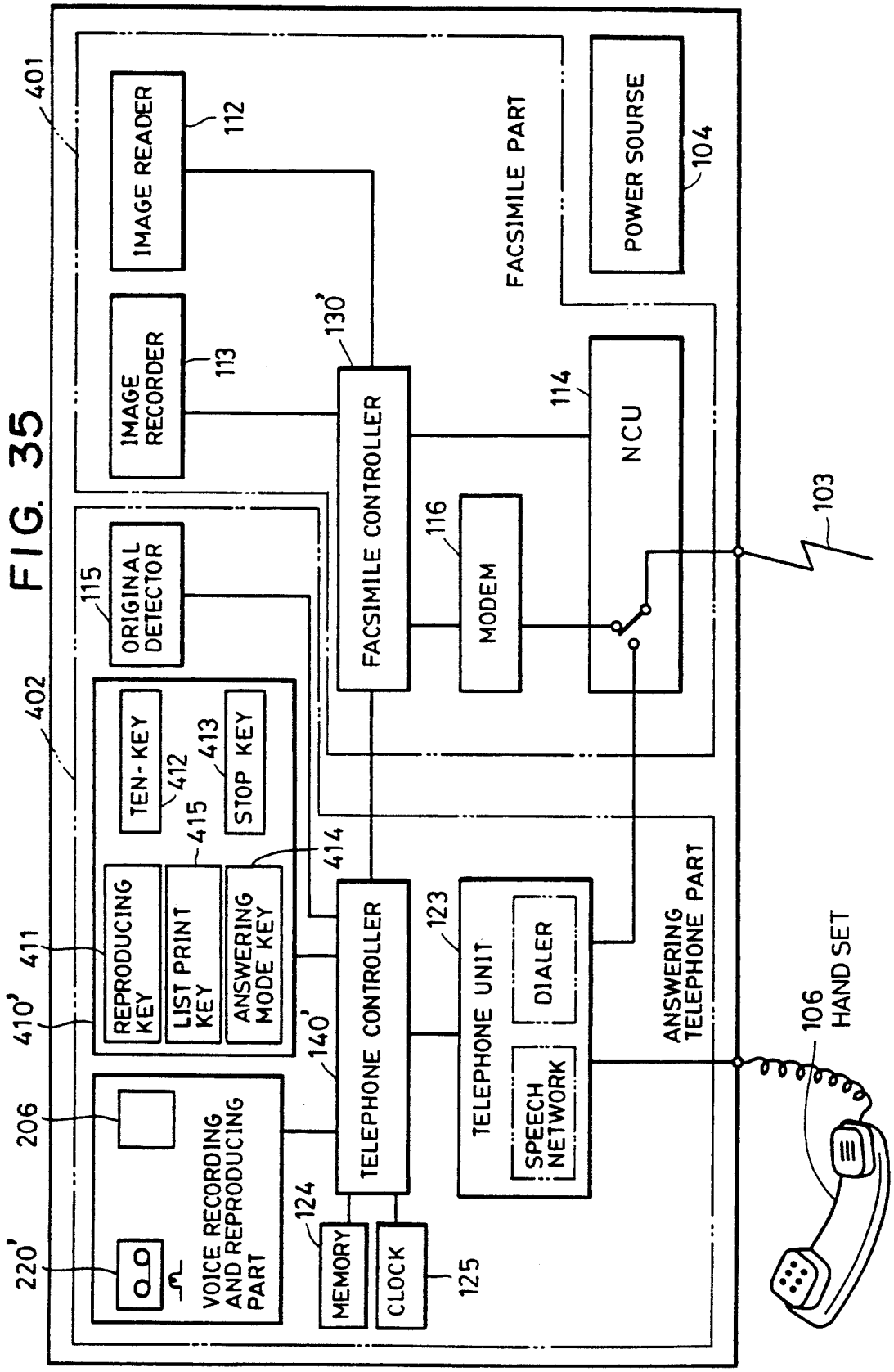
FIG. 35 is a block diagram of a fifth embodiment.

FIG. 35 shows a block diagram showing a structure of a fifth embodiment.

The fifth embodiment is a combination of the first embodiment and the third embodiment, and the function of the first embodiment is accomplished by the structure of the third embodiment as well as in the fourth embodiment.

In FIG. 35, elements having the same functions as in FIG. 29 are identified with the same reference numerals.

Referring to FIG. 35, the operation unit has a list print key 415 for designating to print out the reception list, and the voice recording and reproducing part 220' has a rotation amount detector 206 for detecting the address of the magnetic tape.

Along with the telephone controller 140', the memory 124 for storing the contents of the reception list and the clock 125 for outputting date and time information are also provided as in the fourth embodiment.

Figure 36:
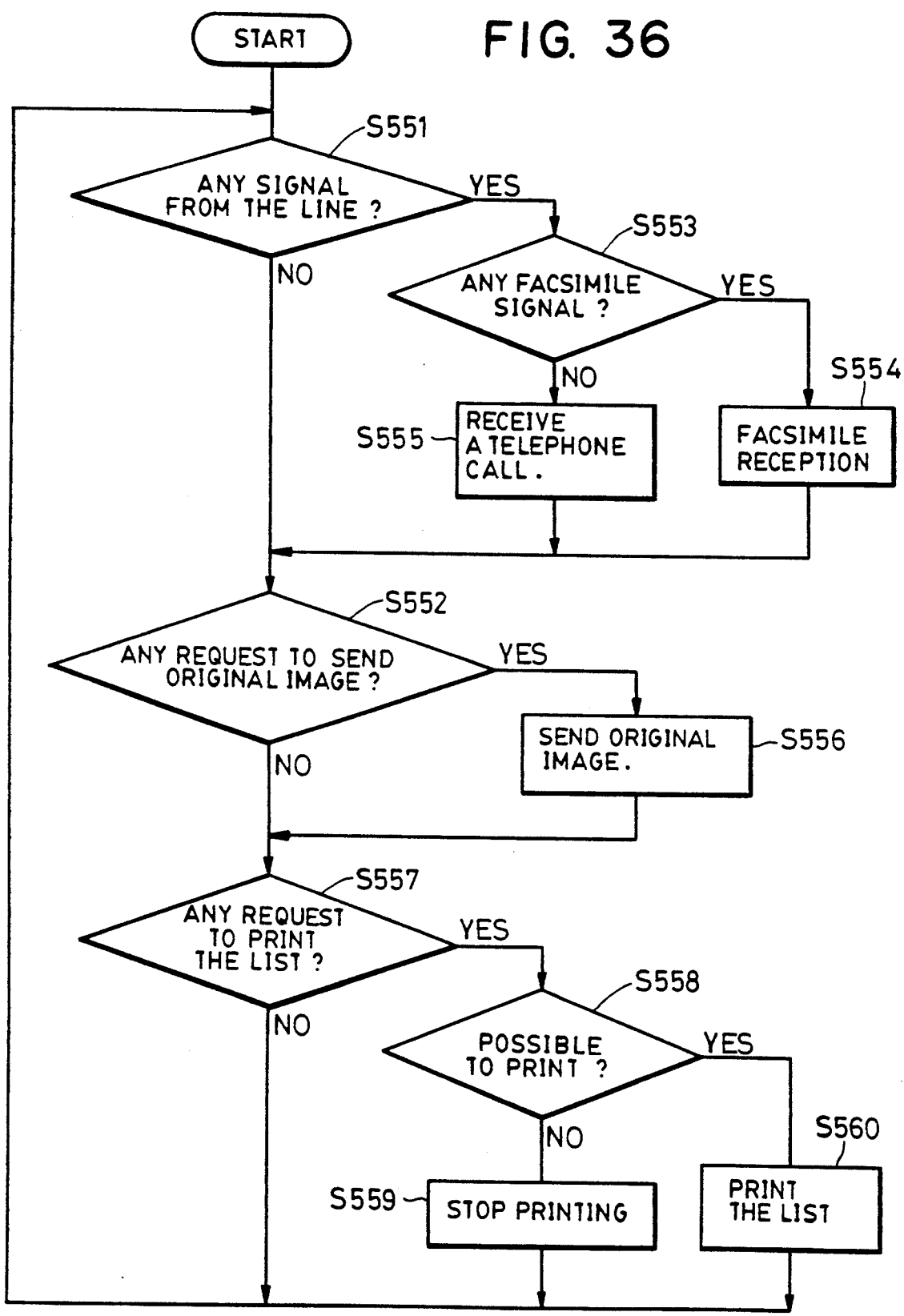
FIG. 36 is a flowchart showing a control program of a facsimile controller in the fifth embodiment.
Figure 37:
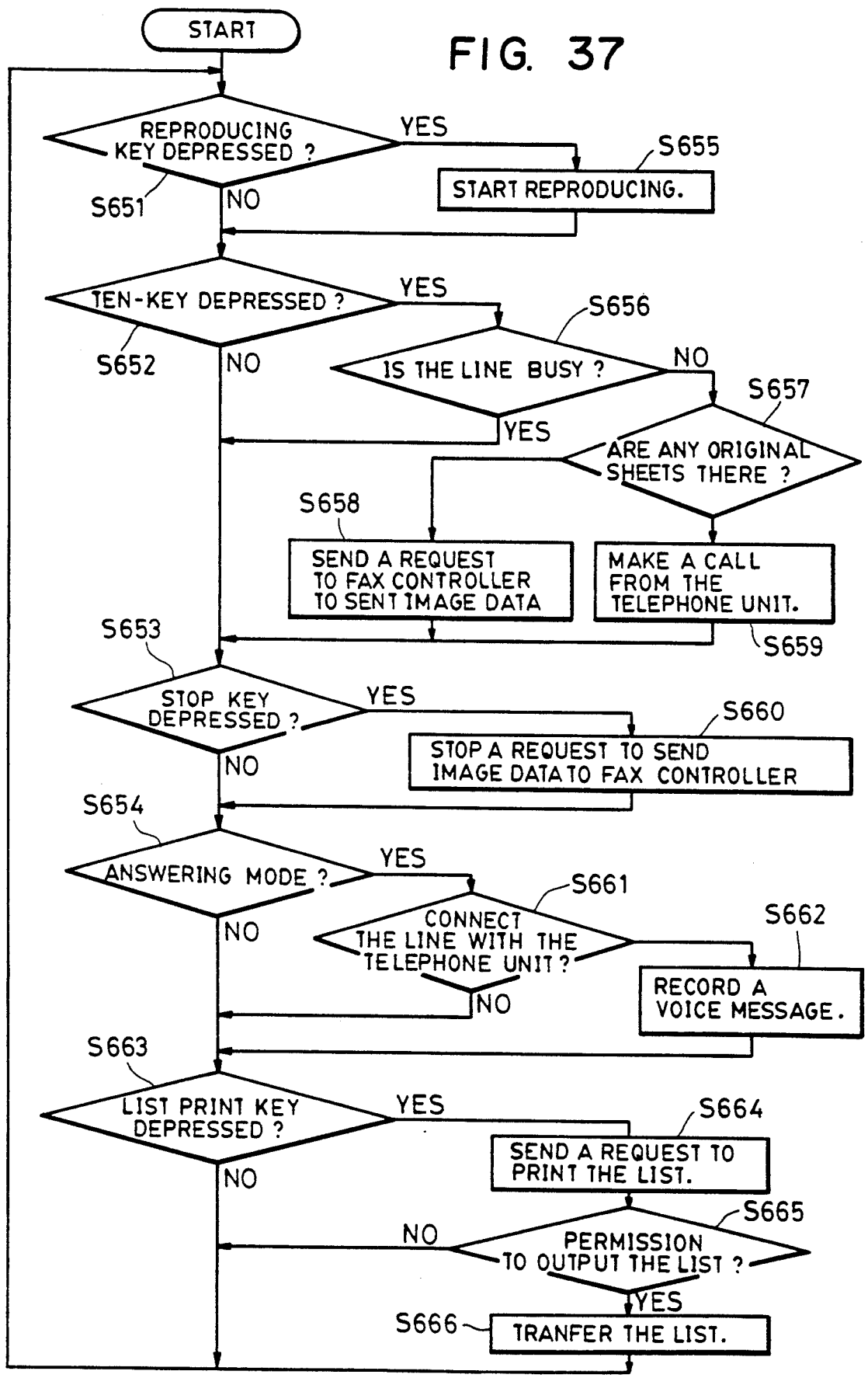
FIG. 37 is a flowchart showing a control program of a telephone controller in the fifth embodiment.

Control operations of the facsimile controller 130' and the telephone controller 140' in the fifth embodiment are shown in FIGS. 36 and 37, respectively. The same operations as in FIGS. 30 and 31 are identified with the same numbers, and their explanations are omitted here.

First, the control operation of the facsimile controller 130' is explained as follows, referring to FIG. 36.

When the telephone controller 140' outputs a request to print out the reception list in response to a depression of the list print key 415 by an operator in step S557, the facsimile controller 130' checks the image recorder 113. If the image recorder 113 is not able to print because of absence of paper or because of a paper jam, the facsimile controller 130' causes the telephone controller 140' to stop outputting the list in step S559. If the recorder 113 is able to print out, the facsimile controller 130' permits the telephone controller 140' to output the list in Step S560.

The telephone controller 140' reads out the starting address of the magnetic tape, the reception time, the telephone number, etc., from the memory 124, and outputs to the facsimile controller 130', after permission for outputting. The facsimile controller 130' causes the image recorder 113 to print out the reception list.

The telephone controller 140' operates as follows.

Figure 38:
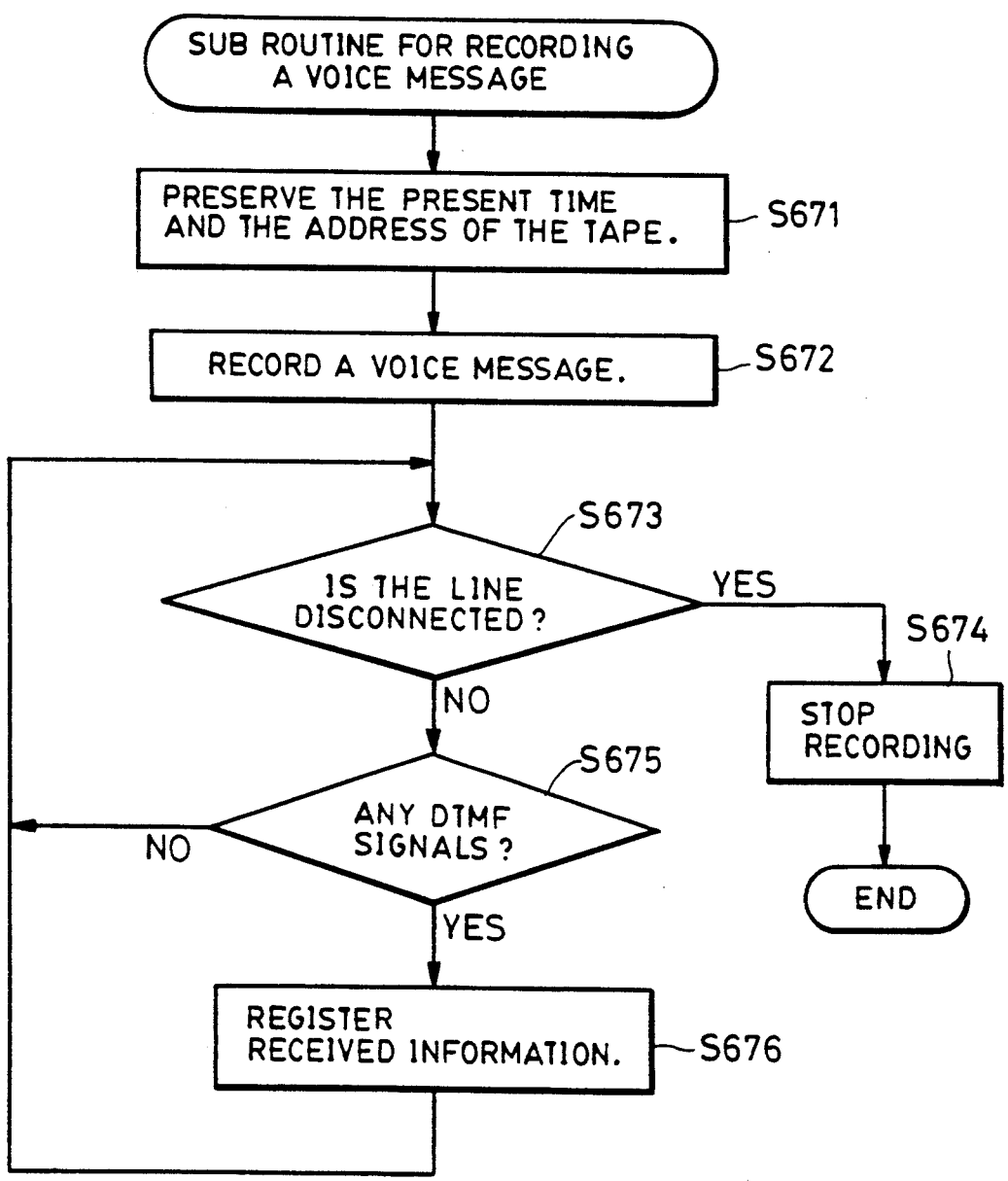
FIG. 38 is a flowchart showing a recording routine for recording a voice message.

In step S622, as in the fourth embodiment, the telephone controller operates as in FIG. 38, and causes storage of the starting address of the magnetic tape, and the time of reception in the memory 124. The memory 124 also stores the telephone number, the operator's name, the identification code and/or the fixed message of the calling station, if the calling station sends these kinds of data with the DTMF signals.

In step S663, when the telephone controller 140' detects a depression of the list print key 415, the telephone controller 140' outputs the request to print out the list to the facsimile controller 130' in step S664. In response to the request, the facsimile controller 130' sends a permission signal or a prohibiting signal of outputting to the telephone controller 140'. If the telephone controller 140' receives the permission signal in step S665, the telephone controller 140' reads out the reception list including the starting address of the magnetic tape storing the corresponding voice message therefrom, the time of reception, and the telephone number the identification code, the operator's name and the fixed message of he calling station. The telephone controller outputs the list to the facsimile controller 113 in step S666. The list from the telephone controller 140' is printed out by the image recorder 136 in step S560 of FIG. 36. The format of the reception list is the same as in the first embodiment, and the starting address of the magnetic tape can be accessed by inputting the starting address on the list with the ten-key 412. Then the voice recorder and reproducing part 220' reproduces the corresponding voice message automatically, as in the first embodiment.

In the fourth and fifth embodiments, the memory 124 and the clock 125 are used with the telephone controllers 120' and 140', but these elements can be used with the facsimile controllers 110' and 130'.

As described above, the fifth embodiment has both the effects of the first and third embodiments: the ease of making operation program, the ability to determine the relative importance of received voice messages, and the ease of accessing the voice messages.

In these embodiments, the magnetic tape is used for voice-messages, but if semi-conductive memories or optical or magnetic discs are used, it is possible to access the desired message faster than with the magnetic tape.

As described above, according to the present invention, it becomes easy for operators to access voice messages which are important for them, it becomes simple to make programs for the apparatus, and the total system of the apparatus becomes more reliable.

Although particular embodiments of the present invention are herein described in detail for the sake of explanation, various modifications thereof, after study of this specification, will be apparent to those skilled in the art to which the invention pertains.

What is claimed is:

1. A communication apparatus comprising:
   first receiving means for receiving a plurality of voice messages from calling stations;
   second receiving means for receiving a plurality of specifying signals for differentially specifying each of the plurality of voice messages received by said first receiving means from the calling stations;
   printing means for printing out information according to the plurality of specifying signals received by said second receiving means on a recording paper at the time that a print demand comes from a keyboard; and
   selectively reproducing means for reproducing a selected one of the plurality of voice messages received by said first receiving means based on a selection demand that comes from the keyboard.

2. A communication apparatus according to claim 1, wherein said first receiving means includes first recording means for storing the plurality of voice messages, and second recording means for storing an address which shows a recording position of the plurality of voice messages.

3. A communication apparatus according to claim 2, further comprising detecting means for detecting the address showing the recording position of the voice message.

4. A communication apparatus according to claim 2, wherein said first recording means is structured such that the recording position is able to be accessed using the address.

5. A communication apparatus according to claim 1, wherein said second receiving means comprises a semiconductor memory, and said first receiving means comprises a magnetic memory.

6. A communication apparatus according to claim 1, further comprising first control means for executing a first control program controlling said first receiving means and second control means for executing a second control program controlling said printing means.

7. A communication apparatus according to claim 6, further comprising a telephone unit for executing a telephone call, and wherein said first control means controls said telephone unit.

8. A communication apparatus according to claim 1, wherein said second receiving means receives the plurality of specifying signals relating to the calling stations.

9. A communication apparatus comprising:
   first communication means for communicating a plurality of voice messages and respective differentially specifying signals from calling stations;
   second communication means for communicating image data;
   first storing means for storing the plurality of voice messages;
   second storing means for storing the plurality of specifying signals;
   printing means for printing the image data received by said second communication means;
   a keyboard;
   first control means for executing a first control program for controlling said first communication means, first storing means and a storing process of said second storing means; and
   second control means for executing a second control program for controlling said second communication means, said printing means and a reading process of said second storing means;
   wherein said second control means controls said printing means such that said printing means prints out on a recording paper information relating to the plurality of specifying signals read out from said second storing means when it is demanded by said keyboard, and
   said first control means controls said first storing means such that said first storing means outputs a selected one of the plurality of voice messages when it is selected by said keyboard.

10. A communication apparatus according to claim 9, wherein said printing means prints out an address indicating a recording position of each voice message stored in said first storing means in connection with each other.

11. A communication apparatus according to claim 9, wherein said second communication means communicates facsimile data.

12. A communication apparatus according to claim 9, wherein said first communication means communicates peculiar code data relating to the plurality of voice messages.

* * * * *